United States Patent
Fujita et al.

(10) Patent No.: US 6,718,232 B2
(45) Date of Patent: Apr. 6, 2004

(54) ROBOT DEVICE AND BEHAVIOR CONTROL METHOD FOR ROBOT DEVICE

(75) Inventors: Masahiro Fujita, Saitama (JP); Tsuyoshi Takagi, Kanagawa (JP); Rika Horinaka, Tochigi (JP); Jun Yokono, Tokyo (JP); Gabriel Costa, Tokyo (JP); Hideki Shimomura, Kanagawa (JP); Katsuki Minamino, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/149,996

(22) PCT Filed: Oct. 11, 2001

(86) PCT No.: PCT/JP01/08953
§ 371 (c)(1),
(2), (4) Date: Sep. 24, 2002

(87) PCT Pub. No.: WO02/32629
PCT Pub. Date: Apr. 25, 2002

(65) Prior Publication Data
US 2003/0060930 A1 Mar. 27, 2003

(30) Foreign Application Priority Data
Oct. 13, 2000 (JP) ........................ P2000-314524

(51) Int. Cl.[7] ............................................. G06F 19/00
(52) U.S. Cl. ................ 700/245; 700/250; 700/253; 700/255; 700/257; 700/258; 700/259; 318/568.11; 701/23; 701/214; 701/301; 180/170
(58) Field of Search ................... 700/245, 246, 700/250, 253, 255, 257, 258, 259; 318/568.11; 382/153; 713/200; 180/170; 701/301, 23, 214; 340/436, 903

(56) References Cited
U.S. PATENT DOCUMENTS 5,983,161 A * 11/1999 Lemelson et al. .......... 701/301
6,275,773 B1 * 8/2001 Lemelson et al. .......... 701/301
6,487,500 B2 * 11/2002 Lemelson et al. .......... 701/301
2002/0158599 A1 * 10/2002 Fujita et al. ............ 318/568.11

FOREIGN PATENT DOCUMENTS

| JP | 7-287695 | 10/1995 |
|---|---|---|
| JP | 11-143849 | 5/1999 |
| JP | 11-175493 | 7/1999 |
| JP | 2000-210886 | 8/2000 |

OTHER PUBLICATIONS

Thrun et al., Probability algorithms and the interactive museum tour–guide robot minerva, 2000, Internet, pp. 1–35.*

Breazeal et al., Infant–like social interactions between a robot and a human caregiver, 1998, Internet, pp. p.1–p.57.*

Ogata et al., Emotional communication robot: WAMOEBA–2R—Emotin model and evaluation experiments—,1999, Internet, pp. 1–16.*

Hara et al., Real–time facial interaction between human and 3D face robot agent, 1996, IEEE, pp. 401–409.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Gordon Kessler

(57) ABSTRACT

A robot apparatus causes the emotion in a feeling part (130) to be changed based on the information acquired by a perception part (120) to manifest the behavior of information acquisition as autonomous behavior. The robot apparatus includes a behavior control part for causing the robot apparatus to manifest a language acquisition behavior and a meaning acquisition part. The robot apparatus also includes a control part for performing the behavior control of pointing its object of learning. The robot apparatus causes changes in internal states, which are ascribable to the object, to be stored in a memory part in association with the object.

16 Claims, 22 Drawing Sheets

| | INPUT EVENT NAME | DATA NAME | DATA RANGE | PROBABILITY OF TRANSITION TO OTHER NODES Di | | | | | |
|---|---|---|---|---|---|---|---|---|---|
| | | | | A | B | C | D | | n |
| node 100 | | | | node 120 | node 120 | node 1000 | | | node 600 |
| NODE OF DESTINATION OF TRANSITION | | | | | | | | | |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | | | | |
| 6 | | JOY | 50.100 | | | 50% | | | |
| 7 | | SUPRISE | 50.100 | | | 100% | | | |
| 8 | | SADNESS | 50.100 | | | | | | |

| No | Uttarance | Meaning | recog result | Estimated Phoneme | Verification Score |
|---|---|---|---|---|---|
| 1 | tomare | stop | tomare | tomare sil | 0.136 |
| 2 | kere | kick | kere | kere | 0.001 |
| 3 | booru | ball | unknown-1 | boureits | 4.835(tomare) |
| 4 | booru | ball | unknown-1 | bouruu | 0.41 |
| 5 | booru | ball | unknown-1 | ssouruu | 0.485 |
| 6 | tako | octopus | unknown-2 | tako | 6.170(kere) |
| 7 | booru kere | kick a ball | unknown-1 kere | pououzu sil kere | 0.956 |

FIG.22

| | | | |
|---|---|---|---|
| Fatigue | Electricity Consuming | Rest(not using electricity) | Rest |
| Energy-2 | FakeFood | Flow to Excrement Buffer | Eat |
| Excrement | Flow from Energy-2 | Defecation | Defecate |
| Energy-3 | Fake Water | Flow to Urine Buffer | Drink |
| Urine | Flow from Energy-3 | Urinate | Urinate |
| Information | Information | Time Decay | Information Acquire |

FIG.23

ROBOT DEVICE AND BEHAVIOR CONTROL METHOD FOR ROBOT DEVICE

TECHNICAL FIELD

This invention relates to a robot apparatus and a method for controlling its behavior.

BACKGROUND ART

In recent years, a robot apparatus formed after the appearance of an animal, such as a dog, is being presented to the market. This robot apparatus acts like an animal, responsive to the information from outside or to its own internal state, such as its feeling state. Among these robot apparatus, there is such a one which makes such behavior as kicking balls, while also there is such a one which is provided with the learning functions. Among these learning functions, there is a language learning function.

One ultimate goals in a pet type robot apparatus is to create a life-like robot apparatus or, in other words, to construct an open-ended system.

Heretofore, it has been attempted to approach to the goal of constructing a life-like robot apparatus by increasing apparent complexity of the robot apparatus. This also takes account of elements such as learning or growth.

However, in mounting these functions, the conventional practice has been to change the probability of a probabilistic state machine, fixedly set for behavior generation, or to exchange the state machine in its entirety.

Although the frequency of occurrence of a behavior is changed by interactions with the user or with the outer world to increase the complexity proper to the robot apparatus, it cannot be said that such complexity is beyond the extent of the behavior or the reaction initially presupposed by a designer (programmer). Similarly, the objects that can be recognized by the robot apparatus are limited such that the robot apparatus cannot recognize more than is set by the programmer. This indicates that the current robot apparatus lacks in the ability to determine how to act against unknown stimuli.

The following is what is necessary in creating an open-ended system which may be beyond the extent of the designer's setting:

(1) the ability to recognize the unknown stimuli;
(2) the ability to create a new behavior; and
(3) the ability to select an appropriate behavior against unknown stimuli.

If the fact that the robot apparatus in question is a pet type robot is taken into account, the ability for a pet-type robot to have interactions with the human being is of particular importance. As a matter of fact, in learning various unknown things, the pet-type robot learns them through interaction with the human being.

What is most important in the interactions with the human being is the communication through a language. As for the ability in recognizing the unknown stimuli (1), optimum categorization, acquisition of the names as symbols and acquisition of the names of the behaviors are thought to be the first steps. This is a research field termed the language acquisition. As pointed out, it is crucial that these symbols be physically correlated or grounded.

This is pointed out by, for example, a report by Kaplan et al. (Kaplan, F. Talking AIBO: First experimentation of verbal interactions with an autonomous four-legged robot, in proceedings of the CELE-Twente workshop on interacting agents, October 2000, referred to below as reference material 1), a report by Roy et al. (Roy, D. and Pentland A. Learning words from natural audio-visual input, in proceedings of International Conference on Spoken language Processing, 1998, referred to below as reference material 2) and by a report by Steels et al. (Steels, L. Perceptually Grounded Meaning Creation, In Proceedings of the International Conference on Multi-Agent Systems, 1996, referred to below as reference material 3).

The behavior acquisition of (2) above may be exemplified by that through imitation, that by reinforced learning and that by evolutionary computing.

This is pointed out by, for example, a report by Damasio (Damasio, A. Descartes' Error: Emotion, and the Human Brain, Putman Publishing Group, 1994, referred to below as reference material 4), a report by Mataric (Mataric, M., Sensory-motor primitives as a basis for imitation: Linking perception to action and biology to robotics, Imitation in Animals and Artifacts, C. Nehniv and K. Dautenhalm (eds), The MIT Press, 2000, referred to below as reference material 5).

As for the appropriate behaviors against unknown stimuli (3), only extremely primitive behaviors in the real world, or a few correlated behaviors in the virtual world, have been reported.

What the above ability (3) connotes is how to acquire the meaning an object has on the robot apparatus, for example, whether it is food, a plaything or what is fearful. It becomes necessary in this connection not only to physically correlate or ground the objects for recognition but also to recognize how the object for recognition affects the internal state of the robot apparatus, such as, for example, the primary emotion or the secondary emotion.

DISCLOSURE OF THE INVENTION

In view of the above-described status of the art, it is an object of the present invention to provide a robot apparatus which is made more life-like, and a method for controlling the behavior of the robot apparatus.

For solving the above problem, a robot apparatus according to the present invention includes behavior control means for causing the robot apparatus to execute an information acquisition behavior as a behavior belonging to the autonomous behavior. The robot apparatus, thus constructed, manifests an information acquisition behavior as a behavior belonging to the autonomous behavior.

For solving the above problem, a behavior control method for a robot apparatus also causes the robot apparatus to execute an information acquisition behavior as a behavior belonging to the autonomous behavior. By this behavior control method, the robot apparatus manifests an information acquisition behavior as a behavior belonging to the autonomous behavior.

For solving the above problem, a robot apparatus according to the present invention also includes meaning acquisition means for acquiring the meaning of an object. The robot apparatus, thus constructed, acquires the meaning of the object.

For solving the above problem, a behavior control method for a robot apparatus according to the present invention also acquires changes in internal states of the robot apparatus that are produced when the robot apparatus acting based on the internal states has taken an action on the object as the meaning of the object.

With the behavior control method for the robot apparatus, the robot apparatus acts based on its internal states and acquires the changes in the internal states, that are produced when the robot apparatus acting based on the internal states has taken an action on the object, as the meaning of the object.

For solving the above object, the robot apparatus also includes speech inputting means, and a plurality of models characterizing a plurality of word sequences, in which the models have been classified based on characteristic values of the word sequences prevailing when the word sequences have been uttered. The robot apparatus further includes speech input evaluating means for evaluating speech inputs, made by the speech inputting means, in accordance with the word sequence characterizing models, and word sequence specifying means for specifying the word sequences of the speech input based on evaluation values of the speech input evaluating means.

With the robot apparatus, thus constructed, the speech input made by the speech inputting means is evaluated by speech input evaluating means, based on the word sequence characterizing models, classified on the basis of the characteristic values of the word sequence uttered, and the word sequence of the speech input is specified by word sequence specifying means, based on the evaluated value of the speech input evaluating means. This enables the robot apparatus to specify the input speech as optimum word sequence.

For solving the above problem, the behavior control method for the robot apparatus according to the present invention also includes a speech inputting step, a speech input evaluating step of evaluating speech inputs, made at the speech inputting step, in accordance with a plurality of models characterizing a plurality of word sequences, and a word sequence specifying step of specifying the word sequences of the speech input based on evaluation values obtained at the speech input evaluating step. The behavior control method enables the robot apparatus to specify the input speech as optimum word sequence.

For solving the above problem, the robot apparatus according to the present invention also includes control means for performing behavior control of pointing its object for learning. The robot apparatus, thus constructed, performs the behavior of pointing its object of learning.

For solving the above problem, the behavior control method for the robot apparatus according to the present invention also controls the behavior of the robot apparatus so that the autonomously acting robot apparatus will point its object of learning. By this behavior control method for the robot apparatus, the robot apparatus performs the behavior of pointing its object of learning.

For solving the above problem, the robot apparatus according to the present invention also includes a sensor for detecting an object, a perception evaluating part for evaluating input signals form the sensor, an internal state management part fed with results of evaluation of the perception evaluating part for managing fake internal states changed based on the results, and storage means for storing the relationship between the object and changes in the internal state which are based on the object.

With the robot apparatus, thus constructed, the changes in the internal state which are based on the object as detected and the object are associatively stored in the storage means when the object is detected.

For solving the above problem, the behavior control method for the robot apparatus according to the present invention also includes a perception evaluating step of evaluating input signals from a sensor which detects an object, an internal state management part for managing fake internal states changed based on results of evaluation at the perception evaluating step, and a storage step of storing the relationship between the object and changes in the internal state which are based on the object. The changes in the internal state which are based on the object as detected and the object are associatively stored in the storage means. With the behavior control method for robot apparatus, thus constructed, the changes in the internal state which are based on the object as detected and the object are associatively stored in the storage means when the object is detected.

Other objects, features and advantages of the present invention will become more apparent from reading the embodiments of the present invention as shown in the drawings.

BRIEF DESCRIPTION OF THE DRAWINGS

FIG. 8 shows a status transition table provided for each node of the finite probability automaton.

FIG. 22 shows the results of speech recognition.

FIG. 23 shows the information pertinent to the internal state.

BEST MODE FOR CARRYING OUT THE INVENTION

Figure 1:
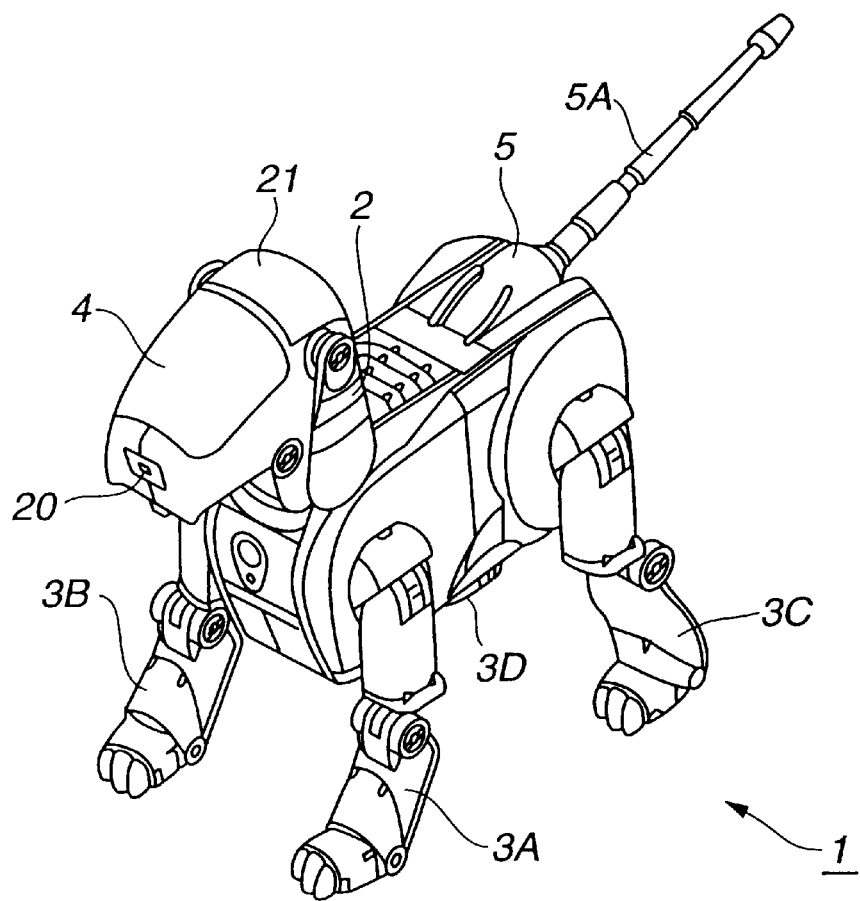
FIG. 1 is a perspective view showing the appearance of a robot apparatus embodying the present invention.

Referring to the drawings, a preferred embodiment of the present invention is explained in detail. This embodiment is directed to an autonomous robot apparatus which behaves autonomously responsive to surrounding environments (external stimuli) and to internal states.

In the present embodiment, the structure of the robot apparatus is first explained and subsequently the diary function exploiting the robot apparatus is explained in detail.

(1) Structure of Robot Apparatus of the Present Embodiment

As shown in FIG. 1, the robot apparatus is a so-called pet robot, simulating an animal, such as a 'dog', and is constructed by leg units 3A, 3B, 3C and 3D, connected on the front and rear sides on the left and right sides of a trunk unit 2, and by a head unit 4 and a tail unit 5, connected to the front and rear ends of the trunk unit 2, respectively.

Figure 2:
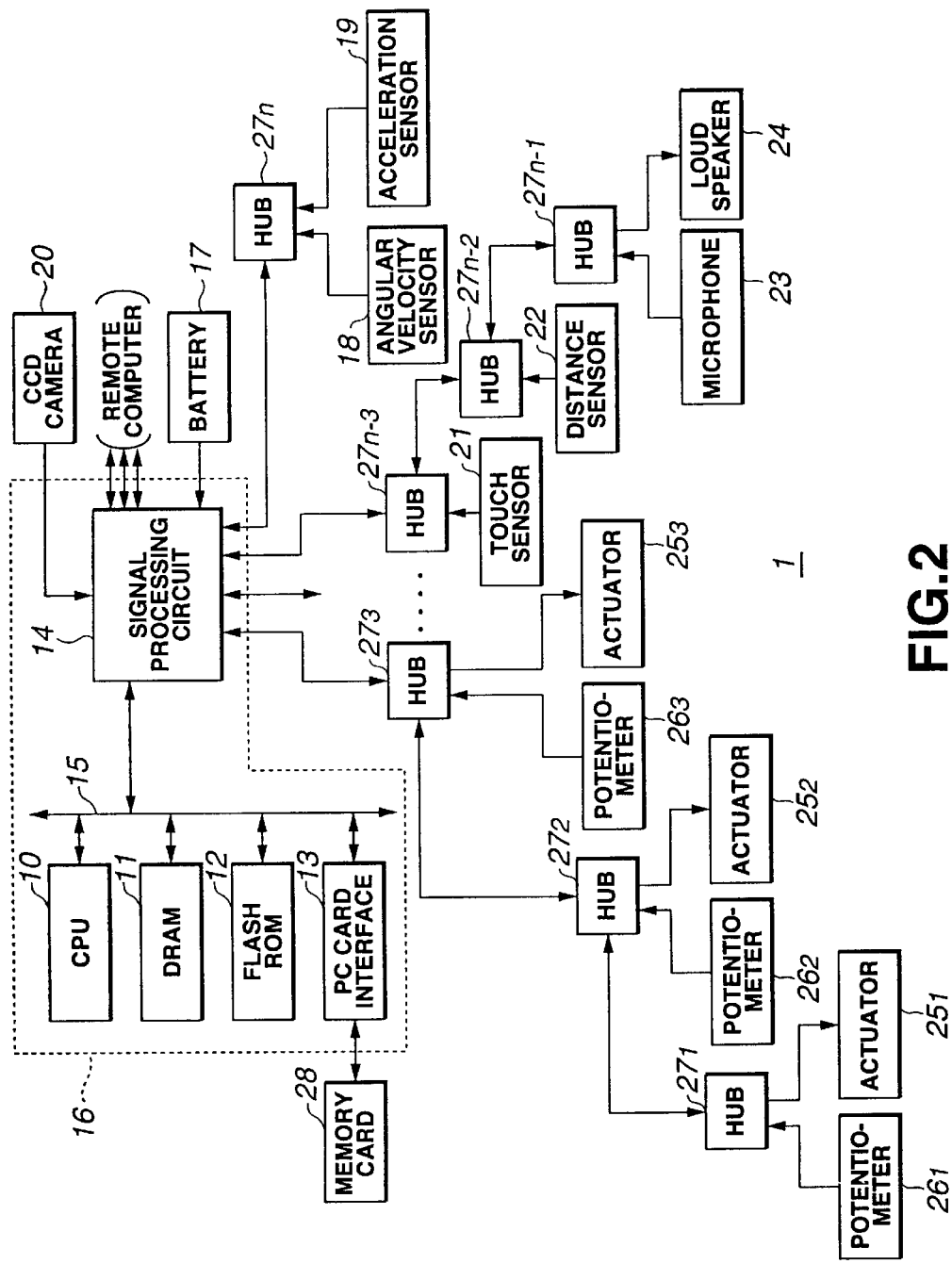
FIG. 2 is a block diagram showing a circuit structure of the robot apparatus.

Referring to FIG. 2, the trunk unit 2 includes a controller unit 16, comprised of an interconnection over an internal bus 15 of a CPU (central processing unit) 10, a DRAM (dynamic random access memory) 11, a flash ROM (read-only memory) 12, a PC (personal computer) card interface circuit 13 and a signal processing circuit 14, and a battery 17 as a power supply for the robot apparatus 1. In the trunk unit 2 are also housed an angular velocity sensor 18 and an acceleration sensor 19 for detecting the posture and the acceleration of movement of the robot apparatus 1.

On the head unit 4, there are mounted, in position, a CCD (charge coupled device) camera 20 for imaging an outside state, a touch sensor 21, for detecting the pressure resulting from a physical action, such as 'stroking' or 'patting' from the user, a distance sensor 22 for measuring the distance to an object positioned ahead, a microphone 23 for collecting the external sound, a loudspeaker 24 for outputting the sound, like whining, and LEDs (light emitting diodes) equivalent to the 'eyes' of the robot apparatus 1.

The joint portions of the leg units 3A to 3D, connecting portions of the leg units 3A to 3D and the trunk unit 2, connecting portions of the head unit 4 and the trunk unit 2 and the connecting portion of a tail 5A of the tail unit 5 are provided with a number of actuators $25_1$ to $25_n$ and potentiometers $26_1$ to $26_n$ corresponding to the number of the degrees of freedom. For example, the actuators $25_1$ to $25_n$ include servo motors. The leg units 3A to 3D are controlled by the driving of the servo motors to transfer to a targeted posture or movement.

The sensors, such as the angular velocity sensor 18, acceleration sensor 19, touch sensor 21, floor contact sensors 23R/L, posture sensor 24, distance sensor 25, microphone 26, distance sensor 22, microphone 23, loudspeaker 24 and the potentiometers $25_1$ to $25_n$ are connected via associated hubs $27_1$ to $27_n$ to the signal processing circuit 14 of the controller 16, while the imaging device 20 and the battery 17 are connected directly to the signal processing circuit 14.

The signal processing circuit 14 sequentially captures sensor data, picture data or speech data, furnished from the above-mentioned respective sensors, to cause the data to be sequentially stored over internal bus 15 in preset locations in the DRAM 11. In addition, the signal processing circuit 14 sequentially captures residual battery capacity data indicating the residual battery capacity supplied from the battery 17 to store the data thus captured in preset locations in the DRAM 11.

The respective sensor data, picture data, speech data and the residual battery capacity data, thus stored in the DRAM 11, are subsequently utilized when the CPU 10 performs operational control of the robot apparatus 1.

In actuality, in an initial stage of power up of the robot apparatus 1, the CPU 10 reads out a memory card 28 loaded in a PC card slot, not shown, of the trunk unit 2, or a control program stored in the flash ROM 12, either directly or through a PC card interface circuit 13, for storage in the DRAM 11.

The CPU 10 then checks its own status and surrounding statuses, and the possible presence of commands or actions from the user, based on the sensor data, picture data, speech data or residual battery capacity data, sequentially stored from the signal processing circuit 14 to the DRAM 11.

The CPU 10 also determines the next ensuing actions, based on the verified results and on the control program stored in the DRAM 11, while driving the actuators $25_1$ to $25_n$, as necessary, based on the so determined results, to produce behaviors, such as swinging the head unit 4 in the up-and-down direction or in the left-and-right direction, or moving the leg units 3A to 3D for walking or jumping.

The CPU 10 generates speech data as necessary and sends the so generated data through the signal processing circuit 14 as speech signals to the loudspeaker 24 to output the speech derived from the speech signals to outside or turns on/off or flicker the LEDs.

In this manner, the present robot apparatus 1 is able to behave autonomously responsive to its own status and surrounding statuses, or to commands or actions from the user.

(2) Software Structure of Control Program

Figure 3:
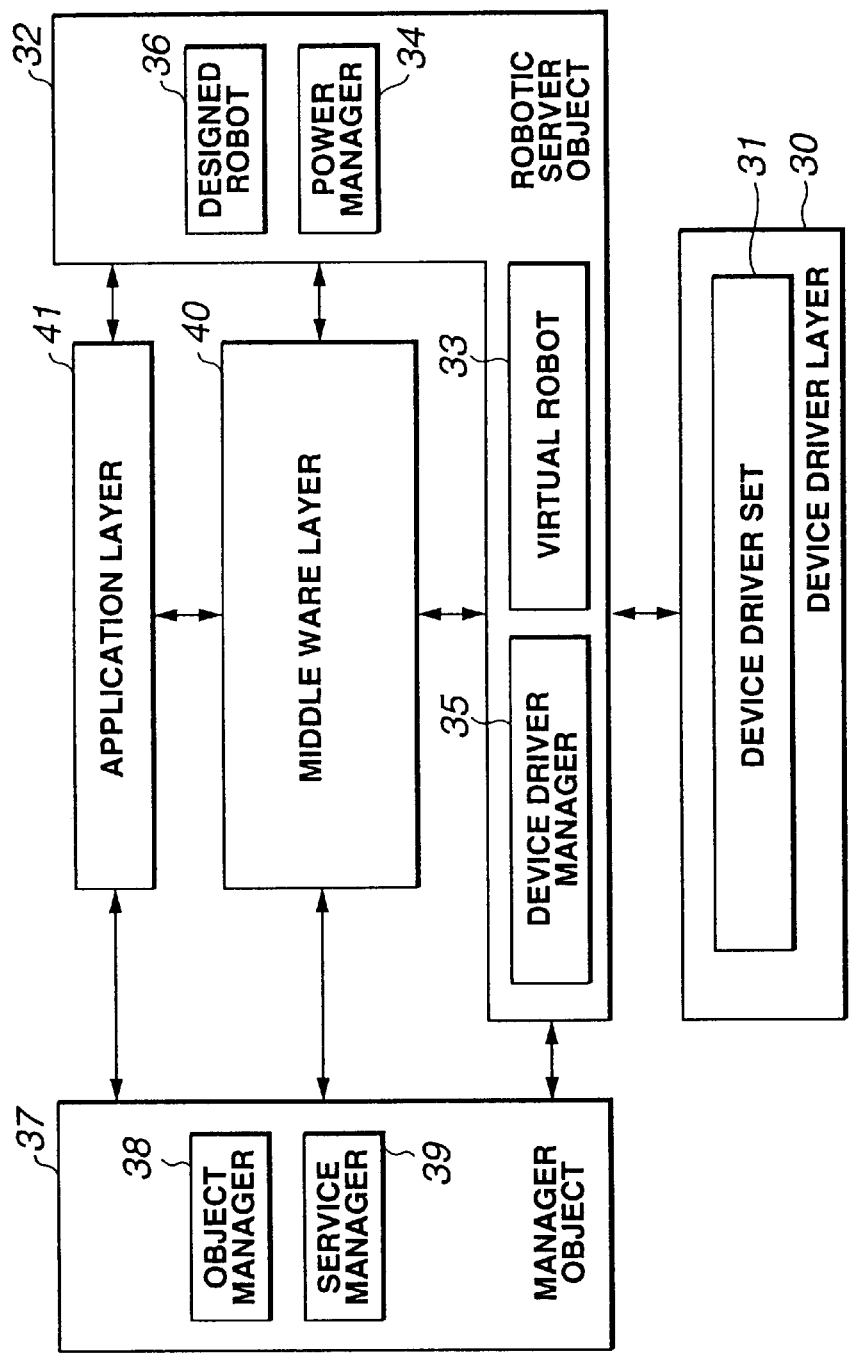
FIG. 3 is a block diagram showing a software structure of the robot apparatus.

FIG. 3 shows the software structure of the above-mentioned control program in the robot apparatus 1. In FIG. 3, a device driver layer 30 is positioned in the lowermost layer of the control program, and is formed as a device driver set 31 made up by plural device drivers. Each device driver is an object allowed to directly access the hardware used in a routine computer, such as an image pickup device 20 (FIG. 2) or a timer, and performs processing responsive to interruption from an associated hardware. A robotics server object 32 is made up by a virtual robot 33, a power manager 34, comprised of a set of software items responsible for switching between power sources, a device driver manager 35, comprised of a set of software items, supervising various other device drivers, and a designed robot 36, comprised of a set of software items supervising the mechanism of the robot apparatus 1. The virtual robot 33, located in the lowermost layer of the device driver layer 30, is comprised of a set of software items furnishing an interface for accessing the hardware items, including the above-mentioned various sensors and actuators $25_1$ to $25_n$.

A manager object 37 is made up by an object manager 38 and a service manager 39. The object manager 38 is a set of software items supervising the booting and the end of respective software items included in the robotics server object 32, a middle ware layer 40 and an application layer 41, while the service manager 39 is a set of software items supervising the connection to respective objects based on the information on the connection among respective objects stated in a connection file stored in a memory card 28 (FIG. 2).

Figure 4:
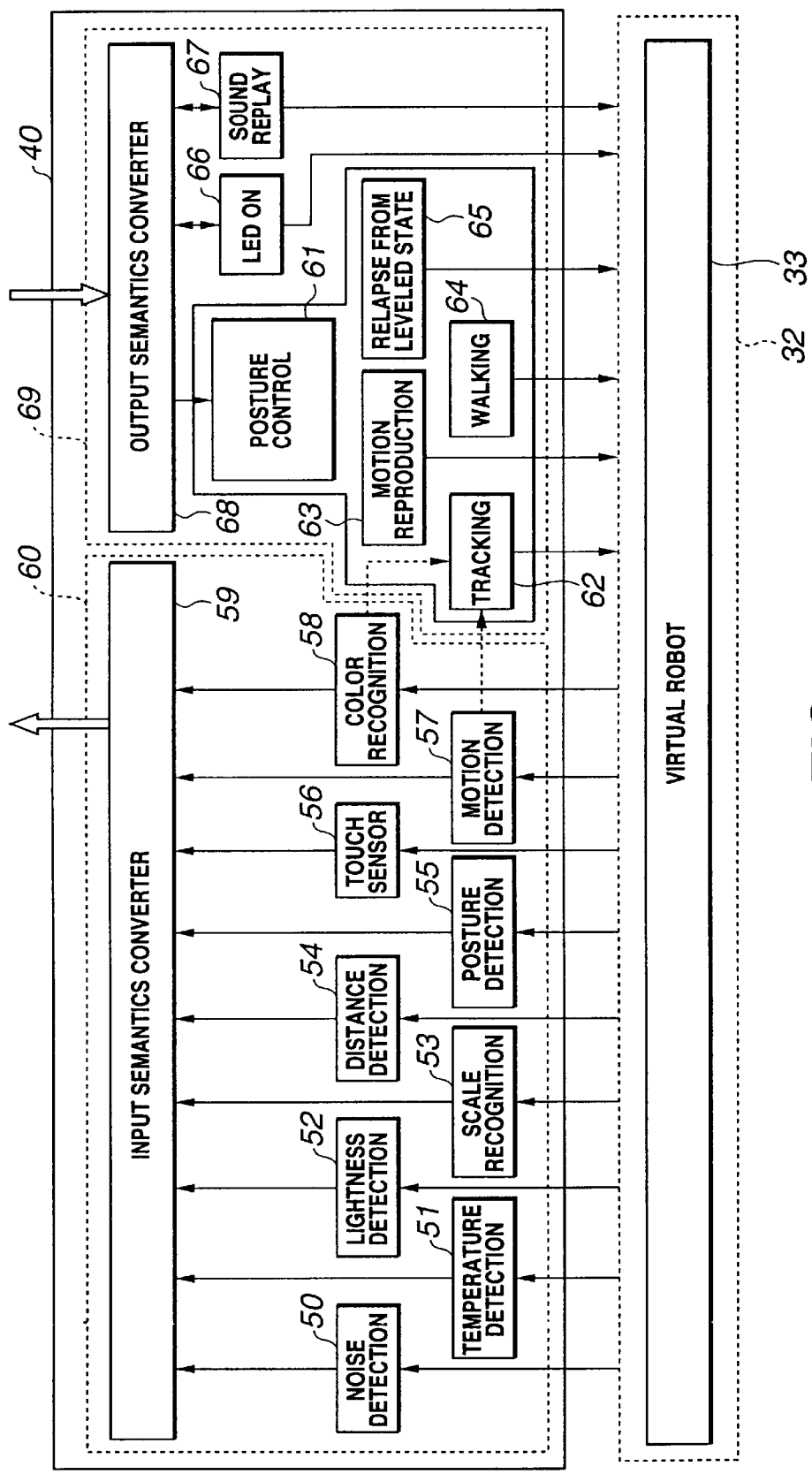
FIG. 4 is a block diagram showing an application layer in the software structure of the robot apparatus.

The middle ware layer 40 is positioned as an upper layer of the robotics server object 32, and is made up by a set of software items providing basic functions of the robot apparatus 1, such as picture processing or speech processing. The application layer 41 is located as an upper layer of the middle ware layer 40, and is a set of software items for deciding on the behavior of the robot apparatus 1 based on the results of the processing by the software items making up the middle ware layer 40. FIG. 4 shows specified software structures of the middle ware layer 40 and the application layer 41.

Referring to FIG. 4, the middle ware layer 40 is made up by a recognition system 60, having signal processing modules 50 to 58 for noise-, temperature- or lightness detection, sound scale recognition, distance- or posture detection, for a touch sensor, for motion detection and for color recognition, and an input semantics converter module 68, and by an outputting system 69, having an output semantics converter module 68 and signal processing modules 61 to 67 for posture management, tracking, motion reproduction, walking, restoration from the falldown state, LED lighting and for sound reproduction.

The signal processing modules 50 to 58 of the recognition system 60 captures relevant data from the sensor data, picture data and the speech data, read out by the virtual robot 33 of the robotics server object 32 from the DRAM 11 (FIG. 2) to process the data and routes the processed results to the input semantics converter module 59. It is noted that the virtual robot 33 is constructed as a component for exchanging or converting signals in accordance with a preset communication protocol.

Figure 5:
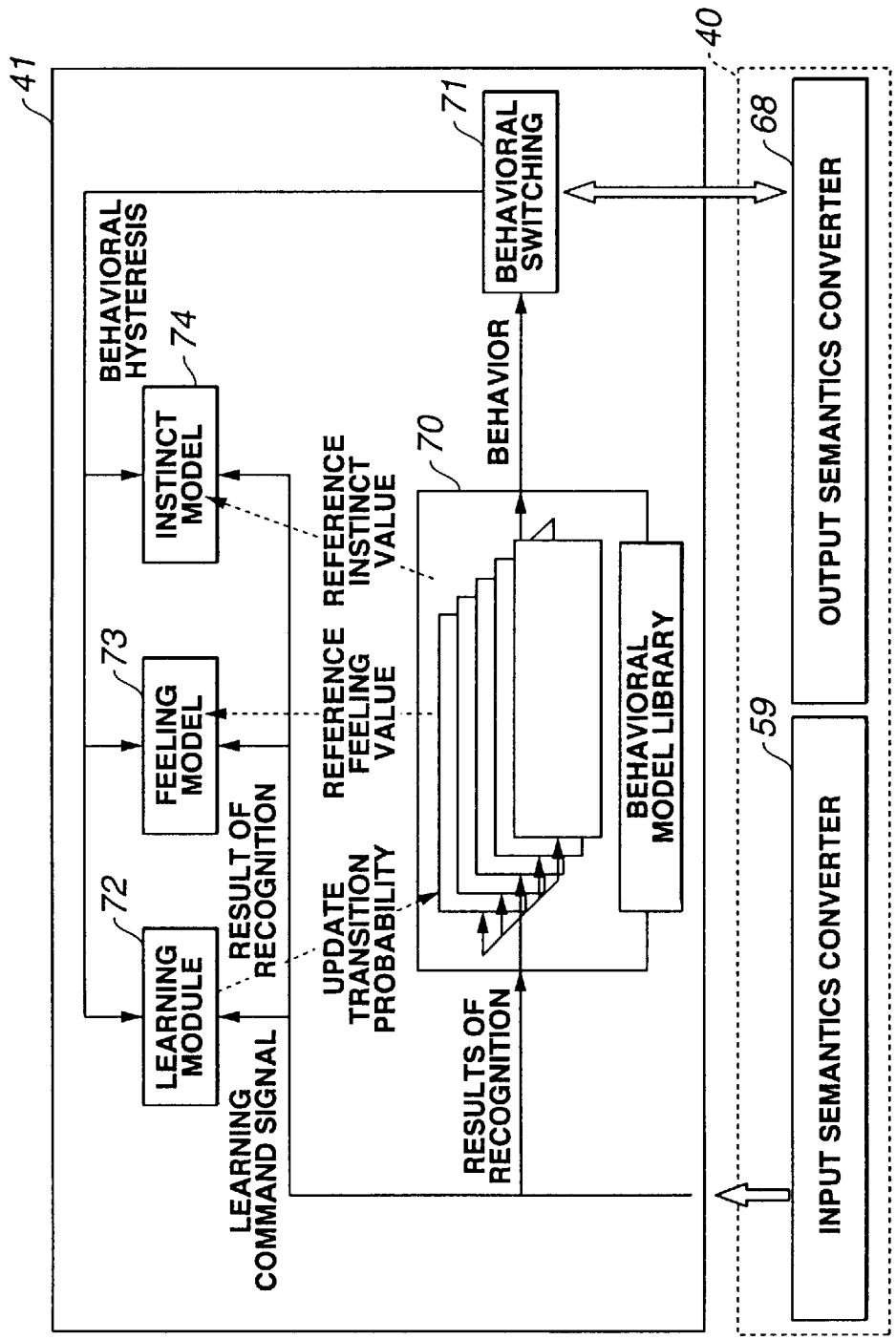
FIG. 5 is a block diagram showing the structure of an application layer in the software structure of the robot apparatus.

The input semantics converter module 59 recognizes the own status, the surrounding status, user's commands or actions, such as 'annoying', 'sultry', 'light', 'a ball has been detected', 'falldown is detected', 'stroked', 'patted', 'do-mi-so scale has been heard', 'a moving object has been detected', or 'an obstacle has been detected' to output the results of recognition to the application layer 41 (FIG. 3). The application layer 41 is made up by five modules, namely a behavioral model library 70, a behavioral switching module 71, a learning module 72, a feeling model 73 and an instinct model 74, as shown in FIG. 5.

Figure 6:
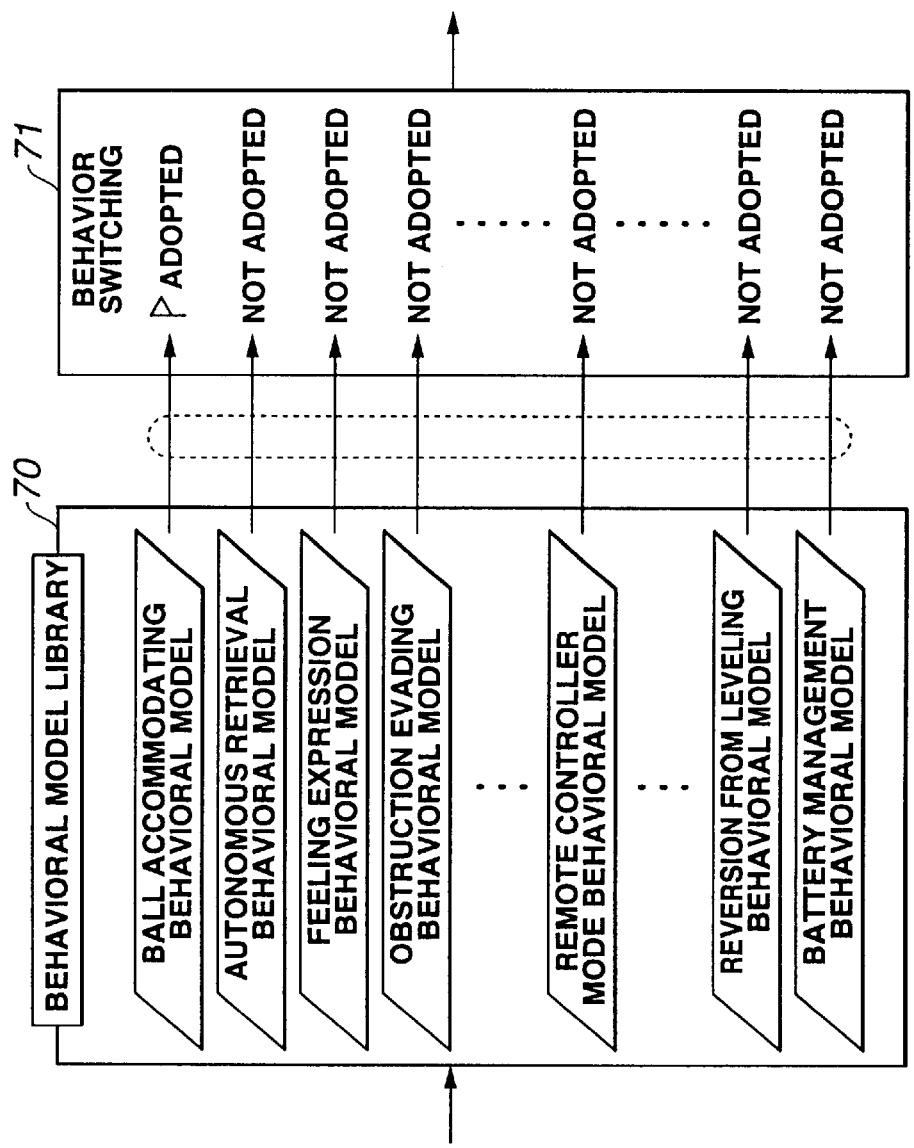
FIG. 6 is a block diagram showing the structure of a behavioral model library of the application layer.
Figure 7:
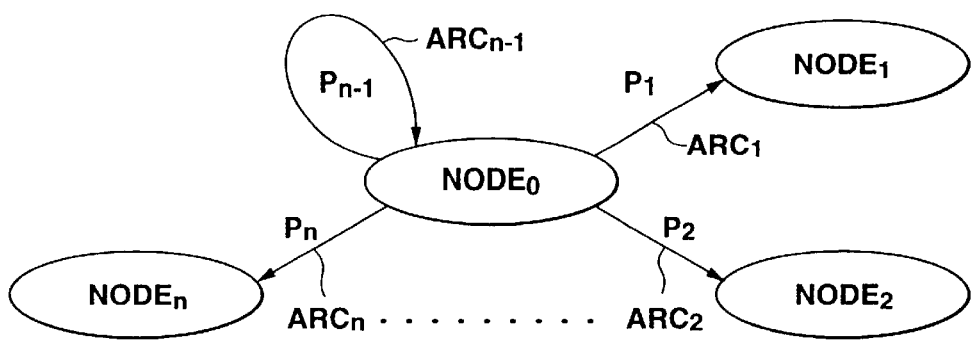
FIG. 7 illustrates a finite probability automaton as the information for behavior decision for the robot apparatus.

In the behavioral model library 70 there are provided respective independent behavioral models $70_1$ to $70_n$ in association with plural pre-selected condition items, such as 'residual battery capacity is small', 'restoration from the falldown state', 'an obstacle is to be evaded', 'the feeling is to be expressed' or 'a ball has been detected', as shown in FIG. 6.

When the results of recognition are provided from the input semantics converter module 59 or a preset time has elapsed as from the time the last results of recognition were provided, the behavioral models $70_1$ to $70_n$ decide on the next behaviors, as they refer to parameter values of the emotion as held by the feeling model 73 and to parameter values of the corresponding desires as held by the instinct model 74, to send the results of decision to the behavioral switching module 71.

In the present embodiment, the behavioral models $70_1$ to $70_n$ use an algorithm, termed finite probability automaton, as a technique of deciding on the next behavior. This algorithm probabilistically determines from which one of the nodes (states) $NODE_0$ to $NODE_n$ to which one of these nodes $NODE_0$ to $NODE_n$ transition is to be made, based on the values of the transition probability $P_1$ to $P_n$ as set for the arcs $ARC_1$ to $ARCn1$ interconnecting the respective nodes $NODE_0$ to $NODE_n$.

Specifically, each of the behavioral models $70_1$ to $70_n$ includes a status transition table 80, shown in FIG. 8, for each of the nodes $NODE_0$ to $NODE_n$, forming the own behavioral models $70_1$ to $70_n$, in association with these nodes $NODE_0$ to $NODE_n$.

In the status transition table 80, input events (results of recognition), as the conditions for transition in the nodes $NODE_0$ to $NODE_n$, are listed in the column of the 'input event name', in the priority order, and further conditions for the transition condition are stated in associated rows of the columns 'data name' and 'data range'.

Thus, in the node $NODE_{100}$, shown in the status transition table 80 of FIG. 8, given the results of recognition 'ball has been detected' (BALL), the ball size (SIZE) being 'from 0 to 1000', as given along with the results of recognition, represents a condition for transition to another node. Similarly, given the results of recognition 'an obstacle has been detected' (OBSTACLE), the distance (DISTANCE) to the obstacle being in a range 'from 0 to 100', as given along with the results of recognition, represents a condition for transition to another node.

Also, in the present node $NODE_{100}$, if no results of recognition are input, but any one of the parameter values 'joy' (JOY), surprise (SURPRISE) or 'sadness' (SADNESS) among the parameter values of the respective emotion and desires, as held in the feeling model 73, among the parameter values periodically referenced by the behavioral models $70_1$ to $70_n$, is in a range between '50 and 100', transition may be made to another node.

Moreover, in the status transition table 80, the node names to which transition can be made from the node $NODE_0$ to $NODE_n$ are shown in the row 'nodes of destination of transition' in the column 'probability of transition to other nodes'. Additionally, the probability of the transition to other nodes $NODE_0$ to $NODE_n$, enabled when all conditions stated in the columns 'input event name', 'data name' and 'data range' are met, is entered in corresponding locations in the column 'probability of transition to other nodes'. The behaviors to be output on the occasion of transition to the nodes $NODE_0$ to $NODE_n$ are indicated in the row 'output behavior' in the column 'probability of transition to other nodes'. Meanwhile, the sum of the probability values of each row in the column 'probability of transition to other nodes' is 100%.

Thus, in the node $NODE_{100}$ represented by the status transition table 80 of FIG. 8, given the results of recognition that 'the ball has been detected' and that the size (SIZE) of the ball is in a range from '0 to 1000', transition to the 'node $NODE_{120}$ (node 120)' can be made with the probability of 30%, and the behavior 'ACTION 1' is then output.

In each of the behavioral models $70_1$ to $70_n$, a plural number of the sets of the nodes $NODE_0$ to $NODE_n$, each stated as this status transition table 80, are concatenated together, such that, given the results of recognition from the input semantics converter module 59, the next behavior is probabilistically determined by exploiting the status transition tables of the $NODE_0$ to $NODE_n$ and the results of the decision are output to the behavioral switching module 71.

The behavioral switching module 71, shown in FIG. 5, sends to the output semantics converter module 68 of the middle ware layer 40 a command to select the behavior output from one of the behavioral models $70_1$ to $70_n$, having a preset high priority order, among the behaviors output from the respective behavioral models $70_1$ to $70_n$ of the behavioral model library 70, and to execute the behavior. This command is referred to below as a behavioral command. In the present embodiment, the order of priority of a given one of the behavioral models $70_1$ to $70_n$ shown in FIG. 6 is the higher the lower the rank of the behavioral model in question in FIG. 6.

The behavioral switching module 71 notifies the learning module 72, feeling model 73 and the instinct model 74 of the effect of the termination of the behavior, based on the behavior completion information afforded from the output semantics converter module 68 after the end of the behavior.

The learning module 72 is fed with the results of recognition of the instructions received as an action from a user, such as 'patting' or 'stroking', from among the results of recognition provided from the output semantics converter module 68.

The learning module 72 changes the probability of transition of the behavioral models $70_1$ to $70_n$ in the behavioral model library 70, based on the results of recognition and on the notification from the behavioral switching module 71, such that, when the action is 'patting' ('scolding') or 'stroking' ('praising'), the probability of occurrence of the behavior in question will be increased or decreased, respectively.

On the other hand, the feeling model 73 is holding parameters representing the intensity of each of the six emotion types, namely joy (JOY), sadness (SADNESS), anger (ANGER), surprise (SURPRISE), disgust (DISGUST) and fear (FEAR). The feeling model 73 periodically updates the parameter values of these emotion types, based on the particular results of recognition provided by the input semantics converter module 59, such as 'patted' or 'stroked', time elapsed and on the notification from the behavioral switching module 71.

Specifically, the feeling model 73 calculates a parameter value $E[t+1]$ of the current emotion type for the next period in accordance with the following equation (1):

$$E[t+1]=E[t]+ke \times \Delta E[t] \qquad (1)$$

where $\Delta E[t]$ in the amount of variation of the emotion type as calculated by a preset equation based on, for example, the results of recognition provided by the input semantics converter module 59, the behavior of the robot apparatus 1 at the pertinent time or on the time elapsed as from the previous updating event, $E[t]$ is the current parameter value of the emotional type and ke is a coefficient representing the sensitivity of the emotion type. The feeling model 73 substitutes the so calculated value for the current parameter value $E[t]$ of the emotion type to update the parameter value of the emotion type. In similar manner, the feeling model 73 updates the parameter values of the totality of the emotion types.

Which effect the respective results of recognition and the notification from the output semantics converter module 68 will have on the variation of the parameter values of the respective emotion types $\Delta E[t]$ is predetermined, such that the results of recognition 'patted' significantly affects the amount of variation $\Delta E[t]$ of the parameter value of the emotion type 'anger', while the results of recognition 'patted' significantly affects the amount of variation $\Delta E[t]$ of the parameter value of the emotion type 'joy'.

The notification from the output semantics converter module 68 is the so-called behavior feedback information (behavior end information) and the information concerning the results of occurrence of the behavior. The feeling model 73 also changes the feeling based on this information. For example, the feeling level of anger may be lowered by the act of 'barking'. Meanwhile, the notification from the output semantics converter module 68 is also input to the learning module 72, which then changes the corresponding transition probability of the behavioral models $70_1$ to $70_n$ based on this notification.

Meanwhile, the feedback of the results of the behavior may be made by an output of the behavioral switching module 71 (behavior seasoned with the feeling).

On the other hand, the instinct model 74 holds the parameters, representing the intensity of five reciprocally independent desires, namely 'desire for exercise' 'desire for affection', 'appetite' and 'curiosity'. The instinct model 74 periodically updates the parameter values of these desires, based on the results of recognition provided from the input semantics converter module 59, time elapsed and on the notification from the behavioral switching module 71.

Specifically, as concerns the 'desire for exercise', 'desire for affection' and 'curiosity', the instinct model 74 calculates, at a preset period, the parameter value $I[k+1]$ of these desires at the next period, using the following equation (2):

$$I[k+1]=I[k]+ki \times \Delta I[k] \qquad (2)$$

where $\Delta I[k]$ is the amount of variation of the desire in question at a pertinent time as calculated by a preset equation based on the results of recognition, time elapsed and the notification of the output semantics converter module 68, $I[k]$ is the current parameter value of the desire and ki is the coefficient representing the sensitivity of the desire in question, and substitutes the calculated results for the current parameter value $I[k]$ to update the parameter value of the desire. The instinct model 74 updates the parameter values of the respective desires except the 'appetite'.

The effect of the results of recognition and the notification from the output semantics converter module 68 on the amount of variation $\Delta I[k]$ of the parameter values of the respective desires is predetermined, such that, for example, the notification from the output semantics converter module 68 significantly affects the amount of variation $\Delta I[k]$ of the parameter values of 'fatigue'.

In the present embodiment, the parameters of the respective emotion types and the respective desires (instincts) are varied in a range from 0 to 100, while the values of the coefficients ke and ki are also set individually for the respective emotion types and for respective desires.

The output semantics converter module 68 of the middle ware layer 40 sends abstract behavioral commands, such as 'go ahead', 'joy', 'cry', or 'tracking (track a ball)', provided by the behavioral switching module 71 of the application layer 41, as described above, to the signal processing modules 61 to 67 of the output system 69, as shown in FIG. 4.

Given a command for a behavior, the signal processing modules 61 to 67 generates servo command values to be supplied to the associated actuators $25_1$ to $25_n$ (FIG. 2) to execute the behavior, speech data of the sound to be output from the loudspeaker 24 (FIG. 2) and/or driving data to be supplied to the LED of the 'eye', based on the behavioral command, and send these data through the virtual robot 33 of the robotics server object 32 and the signal processing circuit 14 (FIG. 2) in this order to the associated actuators $25_1$ to $25_n$, loudspeaker 24 or to the LED.

In this manner, the robot apparatus 1 is able to perform an autonomous behavior, based on the control program, responsive to its own internal state, surrounding state (exterior state) or to the command or action from the user.

(3) Application of the Present Invention to a Robot Apparatus

The technology now explained represents the basis for applying the present invention to a robot apparatus.

(3-1) Schematics of System Structure

First, schematics of a system structure which implements the emotionally grounded symbol acquisition are hereinafter explained.

First, the following problems are presented in constructing a system. These problems are solved by the system of the present invention, and a life-like robot, not achieved conventionally, is to be realized.

The following problems:

(Req-1) how the language acquisition behavior is to be embedded in an autonomous behavior system of the robot apparatus 1;

(Req-2) how the emotionally grounded symbol is to be constituted;

(Req-3) how the objects of the real world to be recognized are categorized; and (Req-4) how the robot apparatus 1 and the human being direct their attention to the same object, that is how is the shared attention problem to be solved were first presented. First, the problem (Req-1) was solved by integrating the methods of generation of autonomous behavior by the ethological model and of acquisition of physically grounded symbols.

It should be noted that the generation of the autonomous behavior by the ethological model is the technique proposed in, for example, a report by Arkin (Arkin, R. C., Fujita, M., Takagi, T., and Hasegawa, R. Ethological Model . . . , submitted to ICRA-2001, referred to below as reference material 6), and in a report by Bates (Bates, J. The Nature of character in interactive worlds and the oz project. Technical Report CMU-CS-92-200, Carnegie Mellon University, October 1992, referred to below as reference material 6).

The method of physically grounded symbol acquisition is a technique proposed in the aforementioned reference materials 1 to 3.

In particular, the information acquisition behavior as the behavior of satisfying the hungry feeling as to the information is defined as one of the autonomous behaviors, and the information acquisition behavior of 'eating' the information is realized as a sub-system similar to the behavior of eating the food. The information as an object to be acquired is the appellation of the object and the meaning.

The subsystem is a system which prescribes the behavior of the robot apparatus 1, which robot apparatus 1 has plural sorts of the subsystems depending on the sorts of the behavior. The subsystem is mainly determined by the perception and by the internal states.

As for (Req-2), the emotionally grounded symbol, the problem is solved by correlating changes in the internal state motivating the behavior in question with the input and the behavior at that time. Specifically, the correlation between the meaning of the object to the individual and the emotion arising when the internal state is met may be enabled by correlating not the internal state itself at the time of inputting but changes in the internal state against the input with the input and the behavior at that time.

As for (Req-3), the real-world objects to be recognized are suitably categorized by categorizing the objects by perception and by employing a statistic model as a categorizer for colors etc detected as perception.

The difference of the robot apparatus from a synthesis creature as proposed in a report by El-Nasr et al., proposed in a virtual world constructed in a computer (El-Nasr, M., Loeger, T., and Yen, J., PETTEI: A Pet with Evolving Emtionally Intelligence, in proceedings of International Conference on Autonomous Agents, 2000, referred to below as reference material 8) is that the robot apparatus must be able to operate in the real world. In the object of the real world, the color, shape and so forth are continuously distributed in the respective characteristic spaces. Moreover, lacking programming, simply viewing an object does not reveal what meaning it really has. So, in solving the above (Req-3), a statistic model is used as a categorizer for the perception.

The solution to the problem of shared attention of (Req-4) is given by spontaneously executing the share attention by exploiting a portion of performing the behavior with attention being directed to an object in the behavior selection of this ethological model.

Among the important functions in the symbol acquisition in the real world are a shared attention or joint attention. In a report by Bruner (Bruner, J. Learning how to do things with words, in J. Brunner and A. Garton (Eds) Human growth and development, Wolfstan College Lectures, Clarendon Press, 1978, referred to below as reference material 9), the shared attention has been pointed out e.g., in cognitive psychology as playing an important role in the learning process of infants. This is the ability for an instructing party and an instructed party, here an infant, to co-own the object of interest, by the infant spontaneously looking in the direction pointed out with the instructor's finger or along the instructor's line of sight.

This shared attention is taken spontaneously into the autonomous behavior by exploiting the portion of the behavior selection of the ethological model of performing the behavior with the attention directed to a certain object.

First, the behavior control which takes the ethological study into account is briefly explained. The ethological motion control technology is discussed for example in the aforementioned reference material 6.

Next, explanation is made of the structure in its entirety, and of how the information acquisition behavior is to be integrated in the software of the autonomous robot apparatus 1, and of the method for solution in connection with the shared attention.

(3-2) Correlation of External Stimuli and Internal States (Fusion of the External Stimuli and Internal Variables)

It is crucial points in the ethological model that the behavior is selected by both the internal states and the external stimuli, and that the motivation generation from the internal states and the release signal from the external stimuli are independently evaluated and correlated (fused) at the time of generating the behavior evaluation (behavior value). This enables generation of a homeostatic behavior which suppresses the internal variables to within a certain extent. Meanwhile, the homeostatic behavior is such a behavior which is manifested such as to maintains e.g., the internal variables at a constant level.

Figure 9:
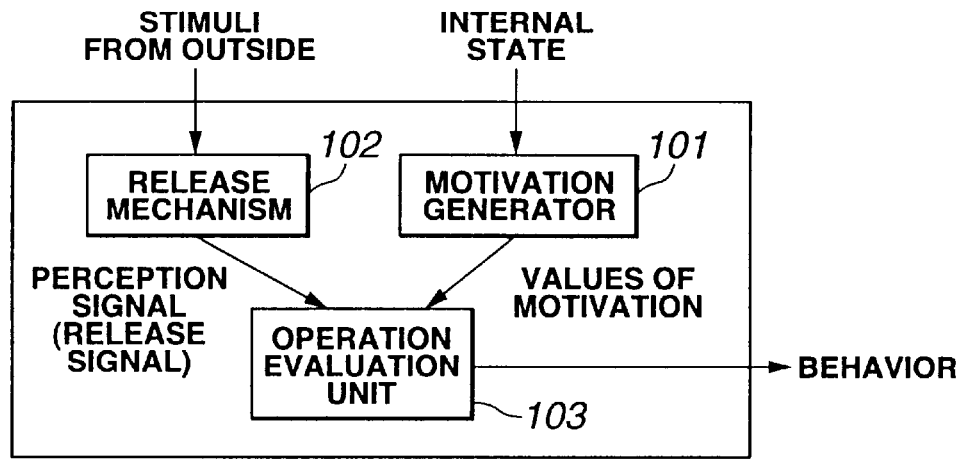
FIG. 9 is a block diagram showing a constituent unit for selecting a behavior.
Figure 10:
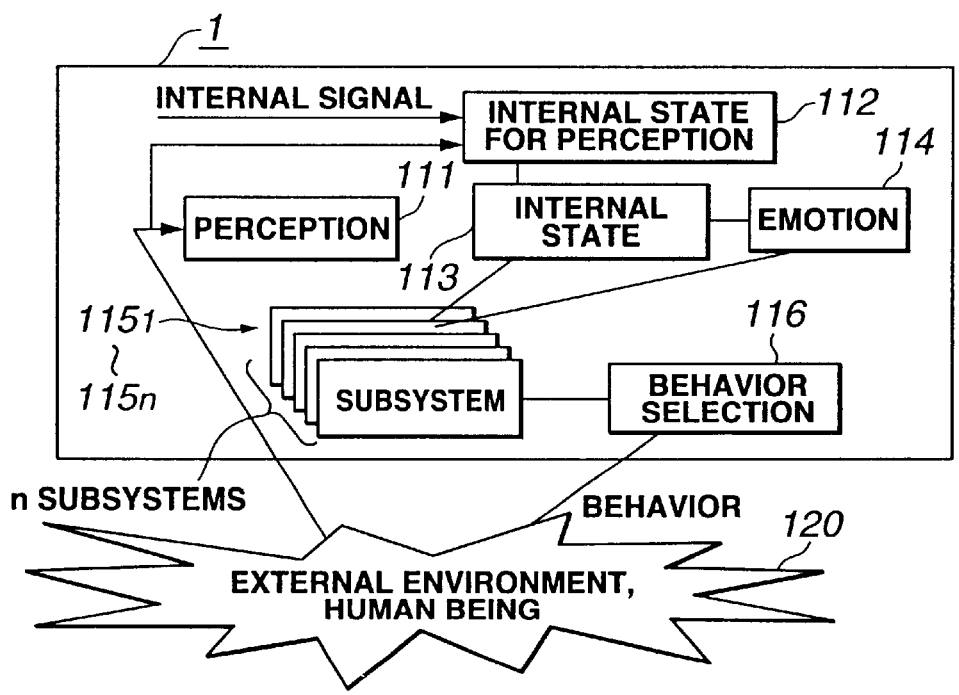
FIG. 10 is a block diagram showing a constituent unit for selecting the behavior by perception.
Figure 11:
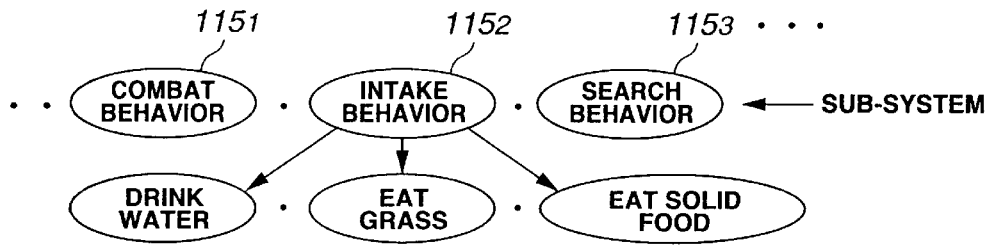
FIG. 11 shows a specified instance of a sub-system.

FIG. 9 shows a configuration which permits independent evaluation of the internal variables and the external stimuli which are associated with each other. FIG. 10 shows a configuration for realizing the homeostatic behavior, more specifically, a configuration in which the behavior is constituted systematically and which construes the external environment to obtain the external stimuli to select the behavior to maintain the constant internal state.

Referring to FIG. 9, a case of the ingestive behavior is explained. A motivation creator 101 evaluates and outputs the motivation value of the ingestive behavior from the internal state such as degree of hungry. A release mechanism 102 evaluates and outputs the external stimuli relevant to the ingestive behavior, for example, a release signal of the ingestive behavior if there is food. The motivation value and the release signal are evaluated independently of each other.

A behavior evaluator 103 evaluates the motivation value and the release signal, and outputs evaluation values of the behavior itself as the behavior value. There exist a plural number of such behaviors for each of which the behavior value is independently calculated and output to an action selection unit as later explained. The action selector selects the behavior which gave the highest evaluation to execute the so selected behavior.

By defining the motivation creator 101 so that an action will be taken which will enable the internal state to be restored to its original range when the internal state has deviated from such optimum range, there is realized a generalized behavior definition of attempting to acquire an object of the behavior if such object exists in the outer world, whereby the homeostatic behavior may be achieved.

(3-3) Emotionally Grounded Symbol Acquisition Architecture

Figure 12:
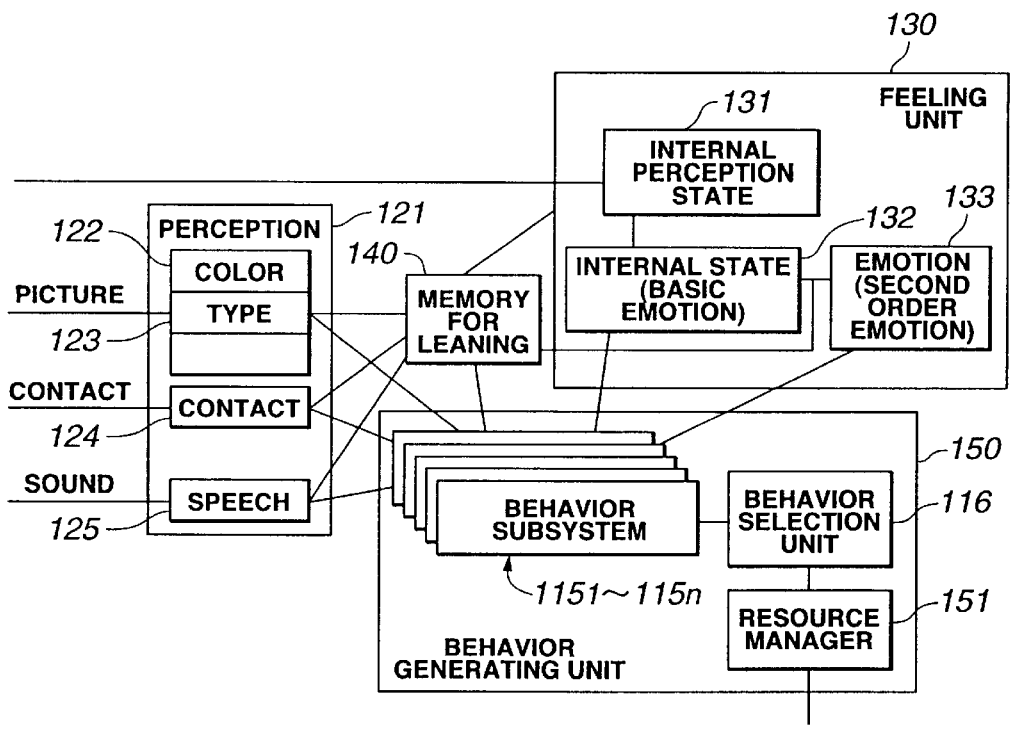
FIG. 12 is a block diagram showing a more specified constituent unit of a behavior selecting structure.

The emotionally grounded symbol acquisition realizes the emotion acquisition behavior with respect to an unknown object as a part of the autonomous behavior. FIG. 12 shows, as an example, a configuration of realizing the emotionally grounded symbol acquisition as a portion of the autonomous behavior. The main points in this system construction may be enumerated by (i) a categorizer of each channel capable of discriminating whether an input is an unknown input or a previously known input;
(ii) associative storage for storing the results of categorization of each channel with the changing timing of the internal variables; and
(iii) integration of the internal variables and the external stimuli by the ethological model.

The above are the points in system construction. Meanwhile, if the external stimuli are known stimuli, an autonomous behavior which is based on the homeostatic behavior by the usual ethological model is initiated.

The emotionally grounded symbol acquisition, realized in accordance with the present invention, features storing with respect to which of the internal state the object is crucial, and thus differs appreciably from the usual physically grounded symbol acquisition.

Thus, the emotionally grounded symbol acquisition correlates the object with the emotionally grounded information. By correlating the information with the object, it becomes possible to evaluate, by a release mechanism, which action is to be taken for a new object.

Moreover, by having changes in the internal state (internal variables) as associative memory in relationship to an object, it is possible to output changes in the internal variables stored in the secondary emotion from the associative memory to generate the second-order emotion, such as joy or fear, as the emotion.

This makes it possible to create expression, affect behavior selection or modulate the movement, as an emotion manifesting behavior, in association with seeing an object.

(3-4) Emotion Acquisition (Eating) Behavior

For realizing the information acquisition behavior, as part of the autonomous behavior, a subsystem, referred to below as information acquisition behavior subsystem, is defined, which has variables relevant to the desire for information acquisition, as factor of the internal state, referred to below as the information acquisition variables.

For example, the information acquisition behavior subsystem is defined as being an internal model, the information acquisition variables of which are increased in case the learning is made for an input the associative memory for which is unknown, and are decreased with time. When the information acquisition variables are depleted, this information acquisition behavior subsystem generates the motivation to the information acquisition behavior.

Moreover, in this case, the release mechanism generates a release signal when the input (information) is unknown. This enables the behavior of acquiring the information, as that of eating the food, to be generated as the fusion of the internal variables and the external stimuli.

Typical of specified behaviors, manifested as the information acquisition behavior, are the behavior of searching for an unknown object, as the desire for information acquisition is increased, and the behavior of querying, such as asking 'what's this?' to it. Such behavior is formed in general through a dialog with the user.

By constructing such system, it is possible to realize information acquisition by curiosity-based dialog and further to naturally embed the information acquisition behavior in the autonomous behavior. That is, the information acquisition behavior is realized as a new element of the interactions realized as the autonomous behavior in the robot apparatus 1.

(3-5) Shared Attention

The shared attention or joint attention is spontaneously embedded in the system. In the system structure, the behavior of the information acquisition (information eating), which is based on the shared attention, is executed as follows:

It is assumed that, by the fusion of the internal variables and the external stimuli, as described above, the information acquisition behavior has been selected by an action selection unit 116.

The object which instigated the release mechanism 102 to issue a release signal is a target performing the information acquisition. If this behavior has been selected solely from the feeling of hunger of the internal state, search is made and a given object becomes the target of the information acquisition behavior. Thus, the target which performs information acquisition becomes a target of the shared attention.

If the robot has the initiative, that is if the information acquisition behavior arises from the hungry feeling of the internal state, the robot apparatus 1 approaches and points its finger to the target to instigate the attention of the human operator to the object to achieve shared attention.

If the user has the initiative, that is if the target is specified based on the release signal issued by the release mechanism 102, the robot apparatus 1 first issues the sound or moves the object to instigate the user's attention. The user may be responsive thereto to point to the target such as with a finger to make a query: 'What's this?'. When the behavior acquisition behavior has been selected by this finger or query, the robot apparatus 1 specifies the object, as pointed to by the finger, as being the object. Thus, even if the user has the initiative, the shared attention to the same object is achieved.

Thus, in the present system, shared attention is taken into the system as a portion of the general concept that attention is desirably paid to the internal state or that attention is to be paid to strong external stimuli.

(3-5) Changes in the Internal State and Emotions (Internal Variables and Emotions)

Referring to FIG. 12, an emotion part 130 is roughly divided into an internal state part for perception 131, an internal state part 132, and an emotional part 133.

The first internal state part 132 supervises dynamics of the internal state itself. The internal state includes nutrients, water, fatigue and curiosity, as fake variables, as will be explained subsequently (FIG. 23). These internal variables may include, in addition to the above, other internal variables found in living organisms or animals. The internal state part 132 monitors the states necessary for individual upkeep to detect that the monitored value is offset from an optimum value. The internal state part 132 also transmits a signal prompting a behavior necessary for holding the internal state to the motivation creator for a behavior necessary for maintaining constancy.

The second part, that is the internal state part for perception 131, is a portion which analyzes an input from an internal sensor or an external sensor to input the results of analysis to the internal state management unit. The sensor signal analysis corresponds to the information concerning the diet detected from the proportion of sugar in the blood, or the information concerning the fatigue, in case of a real animal. In the robot apparatus 1, the sensor signal is the analysis of the residual battery capacity. In the robot apparatus 1, the pseudo appetite is presupposed, and an input signal is produced to maintain the pseudo-constant internal state by performing suitable actions.

The third part, that is the emotional part 133, is a part which generates pleasant or unpleasant feeling by changes in the internal variables to generate emotions corresponding to joy or anger. This emotional part 133 is also termed a second-order emotion and generates a pleasant or unpleasant signal depending on the degree to which the internal emotion, also termed the first-order emotion, is satisfied. Moreover, the emotional part 133 generates the emotions, such as joy, sadness or anger, from these pleasant signal, unpleasant signal, the degree of awakened or convinced states. The second-order emotions are utilized for behaviors for emotion manifestation, such as generation of facial expressions or corresponding light pattern generation of LEDs.

These changes in the internal states are used for the timings of learning by the memory for learning (associative memory) 140, as shown in FIG. 12. This means that learning is effectuated when the internal states have been changed significantly. The internal states and the emotional states are input to a motivation creator of the behavior generating unit for use as incentives for respective behaviors.

(3-6) Perception of Unknown Stimuli

In the development of the robot apparatus 1 in the real world, the 'recognition' is felt to be a serious task. In particular, in real-time recognition under a real environment, it represents a crucial problem whether inputs changing due to various factors should be deemed to be the same as the information already learned, or should be judged to be new stimuli.

Recently, the technique of statistical or probabilistic pattern classification has achieved noticeable results in the field of the recognition. This is the recognition technic of treating the input samples distributed in the characteristic space as the statistic problem of minimizing the risk function and to find parameters therefor. The Hidden-Markov-Model (HMM), which is currently the mainstream in speech recognition, as later explained, is the technique of recognition which also belongs to this category. The HMM is also a representative technique of recognition in picture recognition.

In the present system, this technique of the statistic pattern recognition is used to check whether a given input is an unknown object or an already known object.

In the statistic pattern recognition, the probability or likeliness of whether or not a given object is its prototype is given and used to make discrimination as to whether the object is an unknown stimulus or an already known stimulus. Moreover, if the distance in the characteristic space of a given sensor channel is small such that decision by this sole channel is difficult, a significant difference may be observed with use of another channel to render it possible to adjust discriminating parameters in the original space.

(3-7) Memory for Learning for Storing the Feeling (Associative Memory with Emotion)

The memory for learning (associative memory) is used for conducting the learning with changes in the internal state caused by outputs of respective perceptual channels as a trigger. The learning here means storage of changes in the internal state which acted as trigger in association with an object which caused changes in the internal state, that is an object which affected the internal state.

It is noted that changes in the internal state are produced based on, for example, the quantity that can actually be sensed in the sensor signal analysis, such as current consumed in the joints, and on the pseudo-sensed quantity (detection of the operation of eating the fake food), as described in (3-5) Changes in the internal state and emotions (Internal variables and Emotions). The current consumed in the joints is determined by the number of times of actuations and represent e.g., a factor of fatigue.

As the association, linkage between concurrently occurring events is learned based on the numbers of the prototypes sent from a perception channel and the probability or likelihood proper to the prototype. Among these events, there are so-called physically grounded symbols, such as names of the objects sent through behavior generation. These symbols are also acquired by the learning.

Simultaneously, the changes in the internal state, which acted as trigger, and the behavior taken for the object, are also associatively stored. The result is storage of what changes in the internal states are produced by what behavior taken for an object. Such learning represents acquisition of the emotionally grounded symbols.

It is noted that the emotion is a directly a change in the internal state and hence is termed the first-order emotion. However, since changes in the first-order emotion may cause second-order emotion, and hence the emotion is a symbol grounded with e.g., fear.

(3-8) Subsystem and Behaviors

The behavior is controlled on the basis of subsystems $115_1$ to $115_n$ which are a set of plural classifiable behaviors shown in FIG. 10. The subsystems $115_1$ to $115_n$ are of a hierarchical structure and a tree structure, with the uppermost layer proving an actual subsystem.

In the report by Arkin et al., in the aforementioned reference material 6 in the ethological research, there are listed subsystems which are felt to be necessary and sufficient as the canny behavior. The technology reported in the reference material 6 features defining the ingestive behavior (investigative) as a subsystem as the behavior of eating. For example, the subsystem of the ingestive behavior defines the food as the behavior of eating. This ideally renders it possible to generate a behavior of maintaining the residual battery capacity as the internal state to within a certain range and of generating a motivation of generating the behavior of searching for a site of charging, a desire for charging or automatic charging.

In the present system, this concept is introduced as a step in the information acquisition and provides what corresponds to the 'amount of learning of the novel information' as an item of the internal state, while also defining dynamics of the internal state which decreases with a factor such as time. In such dynamics of the internal state, the behavior corresponding to the 'amount of learning' is generated, as in the case of a battery. For example, the robot apparatus 1 acts in such a manner as to maintain the 'amount of learning' to within a certain range, and searches an unknown object for acquiring the novel information if the 'amount of learning' is depleted. Moreover, when the unknown object exists as an external stimulus, the robot apparatus 1 approaches and points to it by way of conducting a behavior of querying: 'What's this?'. In addition, the robot apparatus 1 generates the behavior of learning the name uttered by an operator by associative storage. Meanwhile, the amount of learning is the amount of change that is determined responsive to the feature of the object being learned or that is decreased with lapse of time.

Moreover, when the name of an object has been learned, it is possible to define the behavior of acquiring what meaning the object's name has on the internal state. This can be realized by testing the object for a certain behavior and by making associative learning between the behavior and the changes in the internal state when the internal state has been changed.

(4) Application to Actual Robot Apparatus (Implementation)

(4-1) Structure of a Four-Legged Robot Apparatus (Enhanced Four-Legged Robot Platform)

Figure 13:
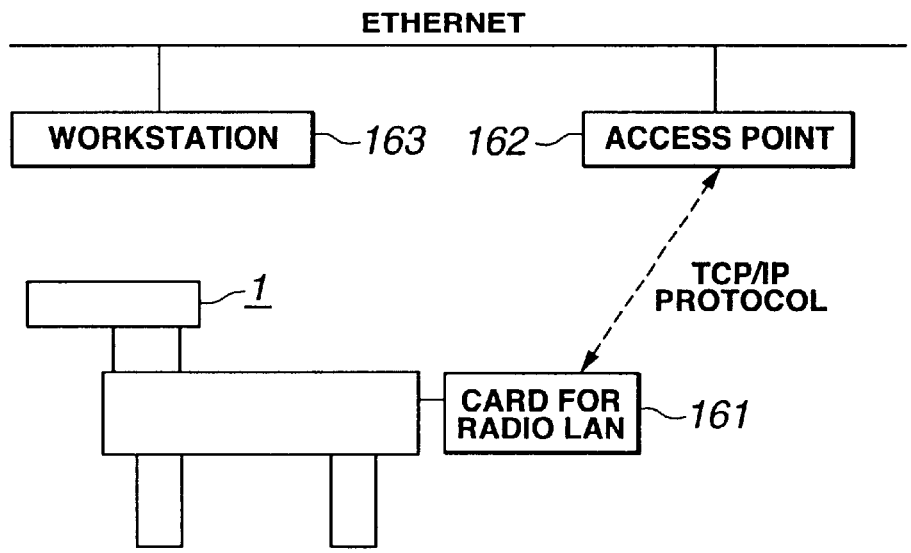
FIG. 13 shows a structure of a network system including the robot apparatus.

The four-legged robot apparatus 1, having the above-described system mounted thereon, is now explained. FIG. 13 shows an instance of a network system having the robot apparatus 1 as a constituent element.

In this network system, the robot apparatus 1 is connected to the network, using a wireless LAN card 161, with the aid of a TCP/IP (Transmission Control/Internet Protocol).

The robot apparatus 1 includes a CPU, having characteristics of approximately 100 MIPS of MOPS R4XXX, and a main memory of 16 MB. This robot apparatus 1 includes a software executing, as an output, primitive behaviors (basic posture transition, to search an object, to track an object, to close to an object, to kick an object, to eat an object etc), and a speech object having a string of pronunciation marks as an input. The robot apparatus 1 also has in store a command for making several expressions, using LEDs, equivalent to the robot's eyes.

In this robot apparatus 1, the above-described system is already constructed, with the robot apparatus 1 realizing information acquisition behaviors as part of the autonomous behavior.

By virtue of the network system, to which the robot apparatus 1 is connected, the operation which is similar to that executed on the robot apparatus 1 can be executed on a workstation 163. The processing on the workstation 163 is performed in the following manner.

The robot apparatus 1 captures input picture signals and transmits the picture to an access point 162 by the wireless LAN card 161 over wireless LAN. The picture is transmitted from the access point 162 to the workstation 163 over the Ethernet.

The detected results of the joint angles at the robot apparatus 1 and the sensor detection information, such as that obtained by the touch sensor or the acceleration sensor, are transmitted to the workstation, just as the picture is transmitted from the robot apparatus 1 to the workstation 163. If processing is to be performed by the workstation 163, the speech can be input by a microphone provided on the workstation 163, without employing the microphone of the robot apparatus 1.

On the workstation 163, the aforementioned perception, evaluation for internal variables, behavior subsystems or action selection, is executed, using the aforementioned input signals, such as pictures. These functions may be implemented by designing the OPEN-R objects on the workstation, as in the robot apparatus 1, by, for example, the OPEN-R manufactured by SONY CORPORATION mounted on e.g., Linux, and by freely interlinking the objects on the network. For example, operations are currently going on based on Matlab program and OPEN-R objects on Linux mixed together.

(4-2) Implemented Functions and Experimental Results

Figure 14:
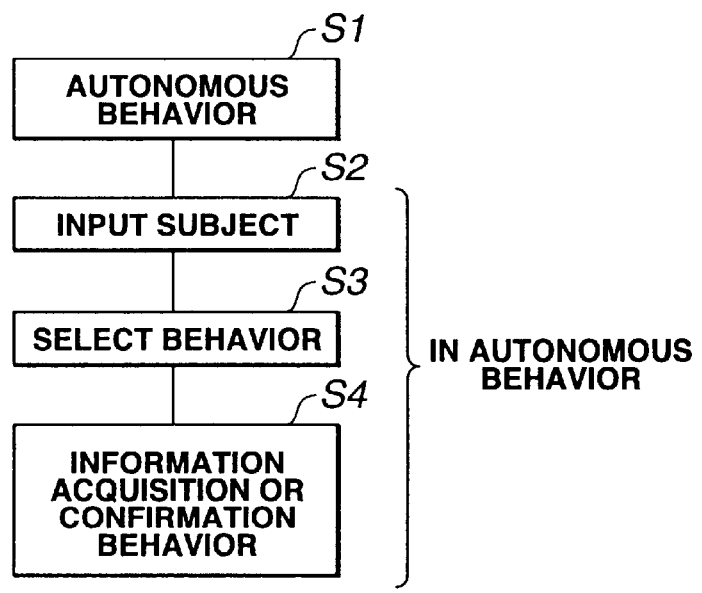
FIG. 14 is a flowchart showing a sequence of operations that are performed until the robot apparatus realizes the information acquisition behavior or an information confirming behavior by joint attention.

By application of the present invention, the robot apparatus 1 is designed to ultimately realize the information acquisition behavior or the emotion confirming behavior by shared attention as a portion of the autonomous behavior. Specifically, the robot apparatus 1 ultimately realizes the information acquisition behavior and the information confirming behavior by shared attention (step S4) through the autonomous behavior (step S1), an object inputting (step 2) and behavior selection (step S3), as shown in FIG. 14. The robot apparatus 1 processes these stages as a portion of the autonomous behavior.

(4-2-1) Perception Part

Referring to FIG. 10, a perception part 111 is provided in the robot apparatus 1. Specifically, the perception part 121 includes, as shown in FIG. 12, a color perception part 122 and a shape perception part 123, for perceiving a picture, a contact perception part (touch part) 124 and a sound perception part 125 for perceiving the sound.

Specifically, the color perception part 122 is a part for effecting automatic color segmentation, as later explained, from the object information, the shape perception part 123 is a part for analyzing the shape of an object, based on the picture information, and the sound perception part 125 is a part for speech recognition responsive to the speech input from a microphone. The following explanation is made on the processing carried out by these perception parts.

The contact perception part (touch part) 124 detects touch to an object by a signal from a so-called flesh ball sensor in the form of a so-called flesh ball provided on the foot sole of the robot apparatus 1.

(4-2-1-1) Automatic Color Segmentation

First, color segmentation, employing the color, is carried out on inputting perceptual stimuli. The color segmentation renders it possible to carve out plural objects of the arbitrary sole color. Also, in color segmentation, that by a clustering algorithm by learning without teachers is used.

Figure 15A:
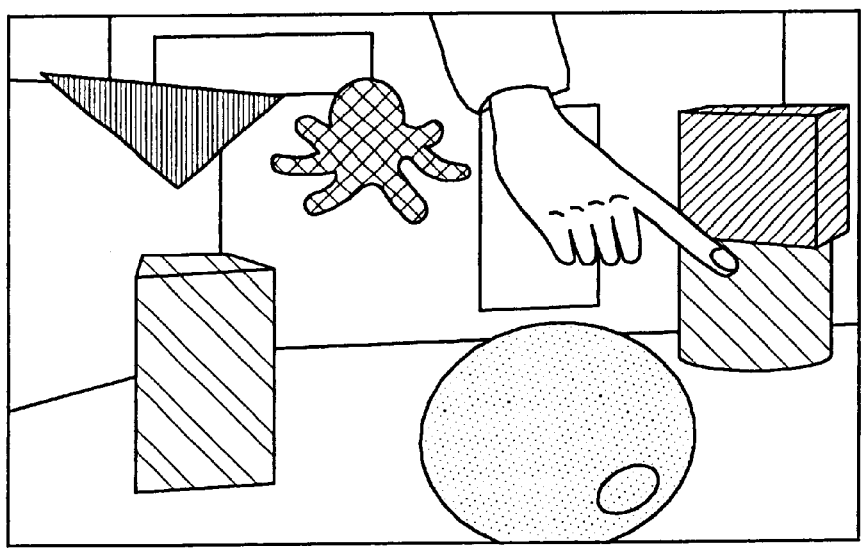
FIGS. 15A and 15B illustrate color segmentation of an input picture which is of an optional unitary color.
Figure 15B:
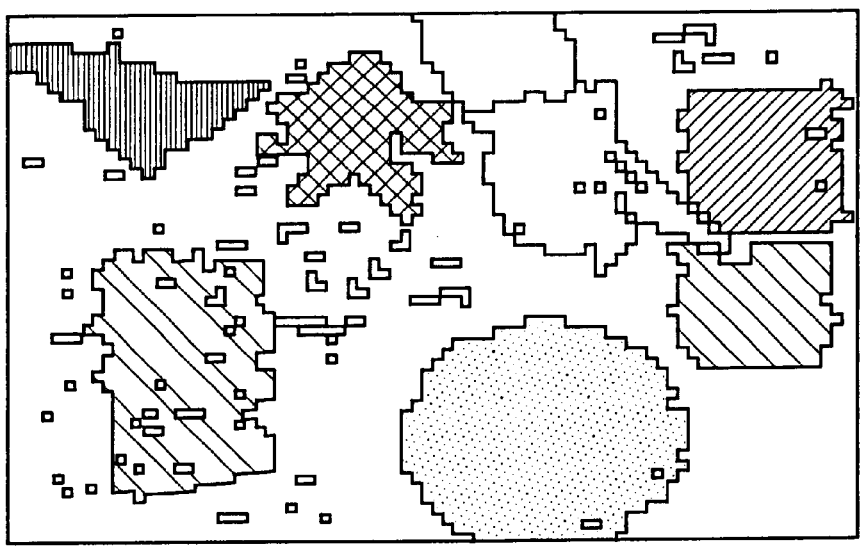
Figure 16A:
FIGS. 16A and 16B illustrate color segmentation of an input picture which includes the human being.
Figure 16B:
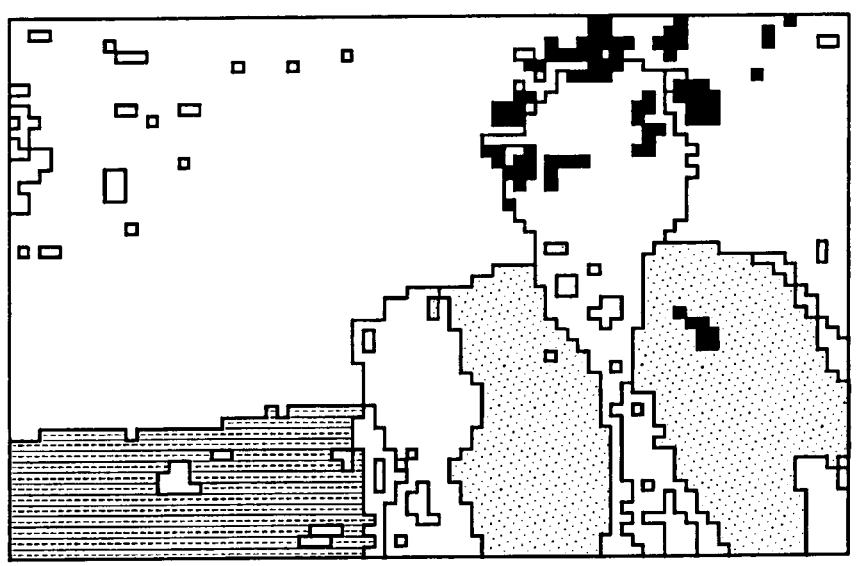

FIGS. 15A and 15B show an artificially painted object and the results of color segmentation thereof, respectively. FIGS. 16A and 16B show a natural picture, inclusive of a hand of a hand and a face of a human being and the results of color segmentation thereof, respectively.

It should be noted that the input picture is already passed through a low pass filter at the time of inputting from a camera of a narrower angle of view (5341 degrees) to the system and thereby degraded to 8860 pixels. In order to take this into account, color segmentation is executed independently from pixel to pixel. By so doing, good results shown in FIGS. 15B and 16B can be obtained substantially in real-time.

Usually, the color segmentation is executed in the RGB space or in the normalized RGB space. Since the camera signals are of the Y, Cr and Cb format, the two-dimensional space of $(Nr, Nb)=(atan(Cr/Y), atan(Cb/Y))$ is used as a color space. This achieves extremely efficient processing taking into account the volume of calculations executed at the time of mapping to the RGB space and quantization errors.

Meanwhile, this color segmentation is used as preprocessing for shape analyses.

The following is an instance of processing steps (i) to (vi) of the clustering algorithm in the aforementioned color segmentation.

At step (i), a suitable number of prototypes are arranged uniformly.

Figure 17:
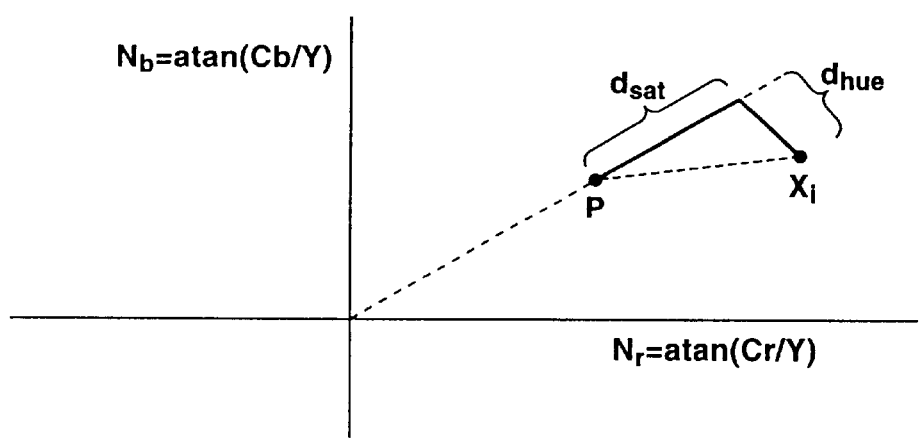
FIG. 17 illustrates clustering of color segmentation.

At step (ii), class levels to the closest prototypes are afforded to the totality of pixels, with the following equation (3):

$$d = \sqrt{\frac{d_{hue}^2}{\sigma_{hue}^2} + \frac{d_{sat}^2}{\sigma_{sat}^2}} \quad (3)$$

as distance. In the above equation, hue and sat denote the distribution for the hue and the saturation, respectively as found at the outset from the distribution of suitable sample pictures, as shown in FIG. 17. In general, hue<sat. That is, the above distance may be thought of as the weighted errors in the hue direction.

At step (iii), if the number of the pixels belonging to the prototype is small, the prototype is changed.

At step (iv), the prototype is moved to an average position having the same class label.

If, at step (v), if two or more prototypes are of a distance less than a certain distance, these prototypes are grouped together into one prototype.

At step (vi), if the number of times of updating the prototype positions is less frequent, or has reached a proper value, the operation is terminated. If otherwise, the processing reverts to the above step (ii) to re-start the processing.

Figure 18A:
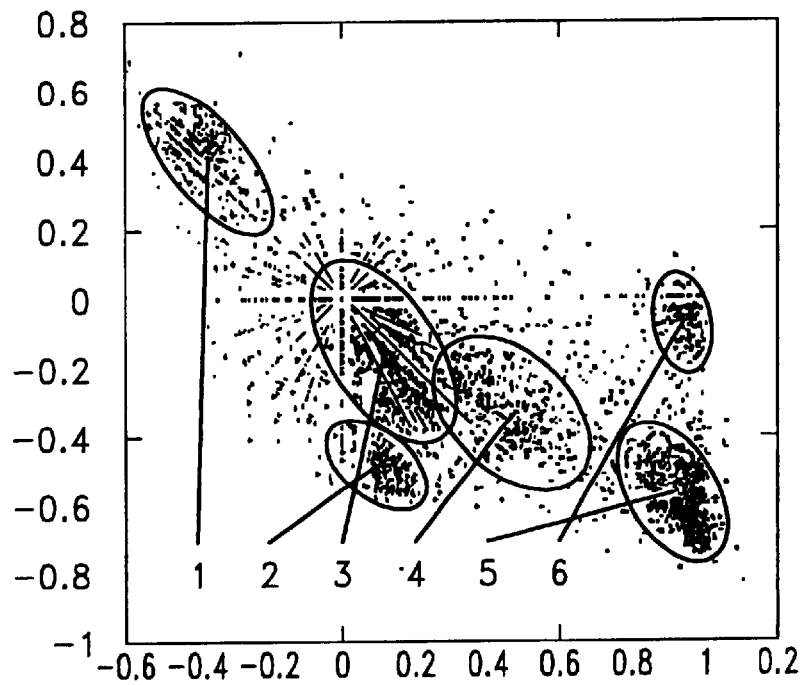
FIGS. 18A and 18B illustrate clustering of an input picture.
Figure 18B:
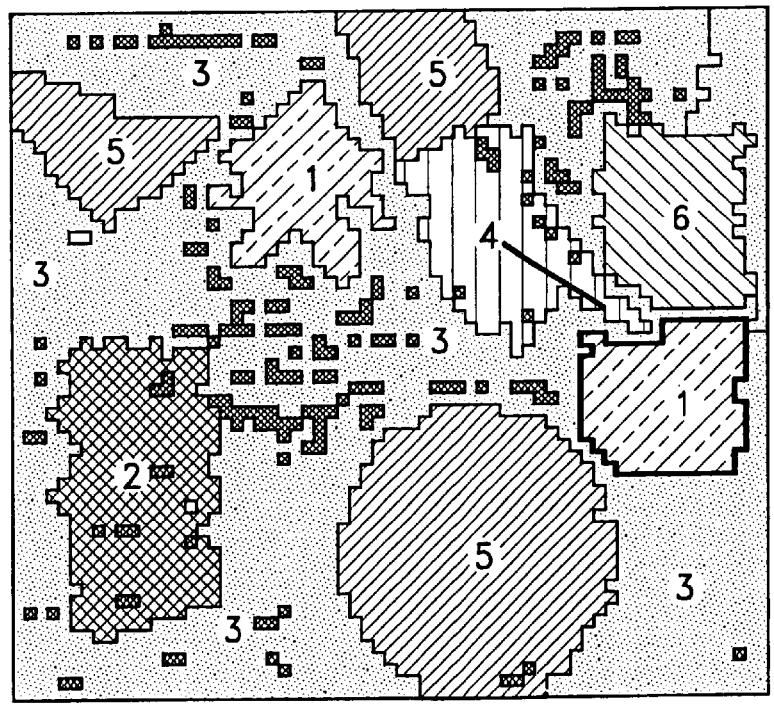

FIGS. 18A and 18B show the status of clustering for an input picture. FIGS. 18A and 18B show a case where a previously stored skin color area is analyzed to detect the pointing direction as well as to strip out an object lying on a line of extension. This information is used in the shared attention which will be explained subsequently.

(4-2-1-2) Shape Analysis

Figure 19:
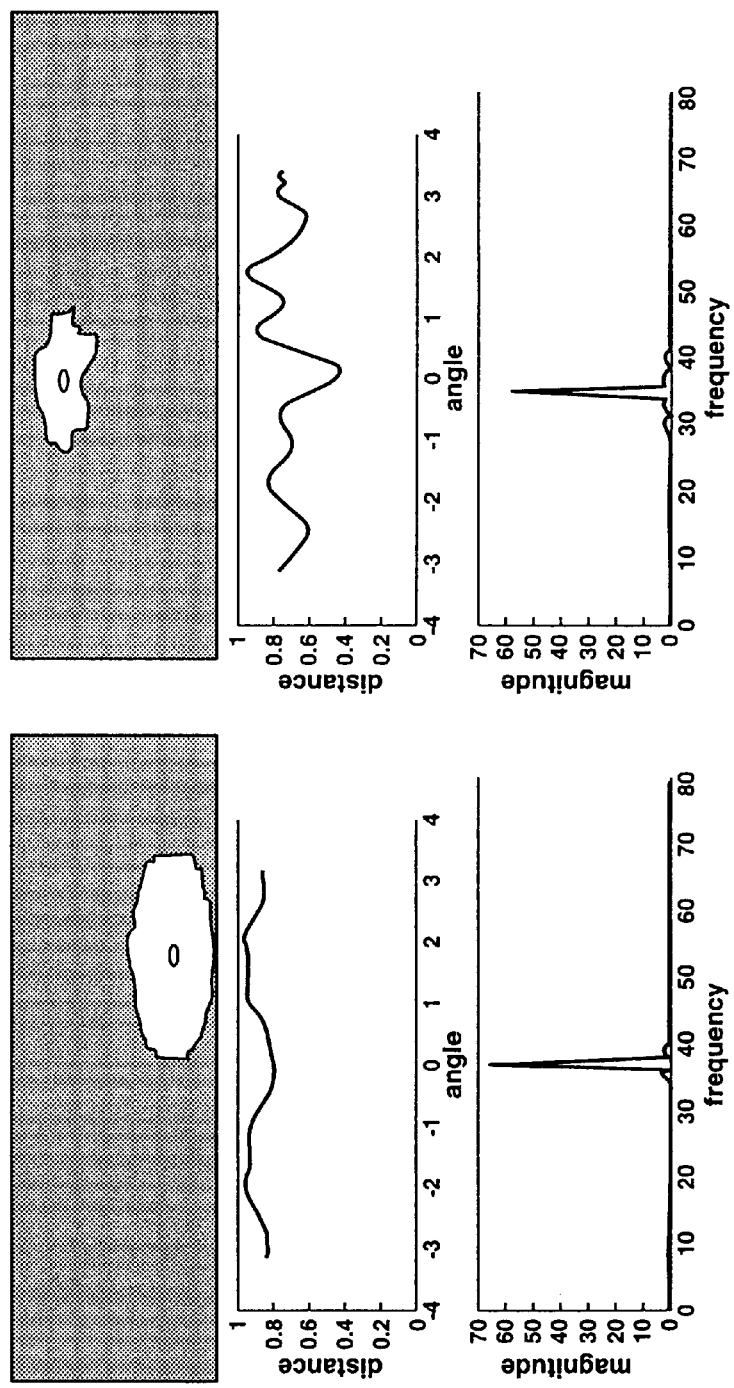
FIG. 19 shows the results of outer shape analysis sliced by color segmentation.

The shape analysis is performed using a Fourier descriptor which has an invariance to the size and the rotation. In this shape analysis, the L2 norm in the Fourier descriptor space (64th dimension) is used for categorization. The input object is represented by the FD space and, using the distance to the nearest prototype, whether or not a prototype in question is to be a novel prototype is determined. FIG. 19 shows the results of the shape analysis of an object as cropped by color segmentation.

(4-2-1-3) Speech Recognition

As the speech recognition, the continuous speech recognition employing the HMM is used. This technique may be exemplified by that proposed in the aforementioned reference material 5.

Figure 20:
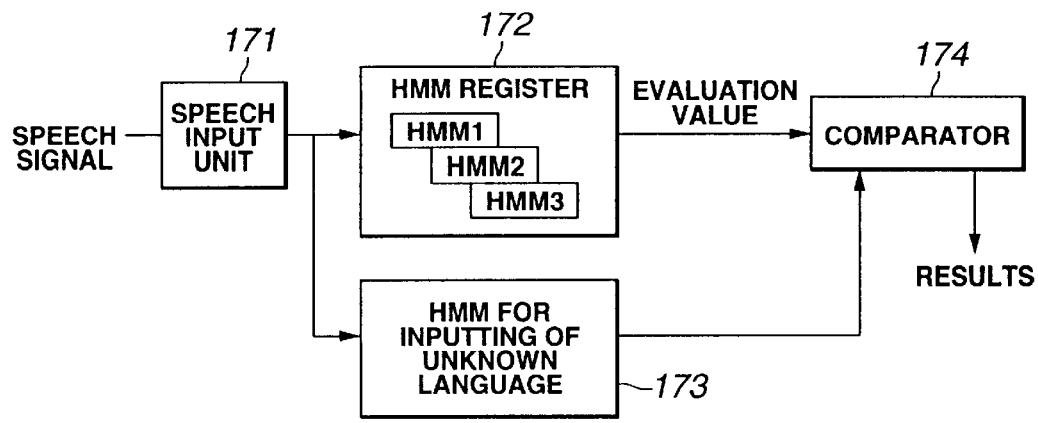
FIG. 20 is a block diagram showing a constituent unit which achieves recognition of the uttered speech.

Referring to FIG. 20, this system is provided with a speech input unit 171, an HMM register 172, having plural HMMs, an HMM for inputting unknown languages 173 and a comparator 174.

The HMM of the HMM register 172 is the HMM which has studied the Japanese phonemes and which has necessary words registered therein at the outset. In the HMM of the HMM register 172, there are included words acquired later and learned. Examples of the registered or acquired words include nouns and verbs. The input phoneme series are evaluated as the degree of confidence (verification value) in the HMM of the HMM register 172.

Figure 21:
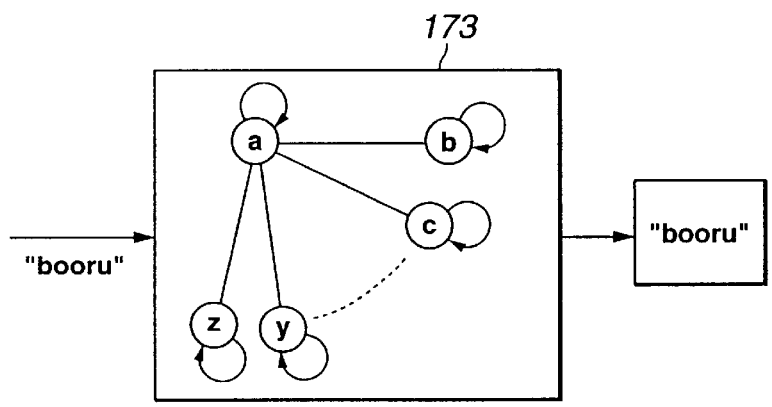
FIG. 21 shows an illustrative structure of HMM for inputting unknown languages.

The HMM for inputting unknown languages 173 is an HMM for acquiring unknown words. This HMM for inputting unknown languages 173 has the totality of phoneme models as states and links to the totality of the phoneme states, as shown in FIG. 21. If a speech input 'bouruu' is made, the HMM for inputting unknown languages 173 recognizes it as 'booru', as shown in FIG. 21.

An input phoneme sequence is evaluated by the HMM for words already registered or acquired and by this HMM for inputting unknown languages 173. At this time, the distance from the HMM which exhibits the maximum match is evaluated in the comparator 174, using the verification value. If the verification value is larger than a preset value, the phoneme sequence in question is newly labeled as a novel phoneme sequence, which is registered as the HMM of the HMM register 172.

By way of an example, the case in which the HMM register 172 includes only two registered words 'tomare (stop)' and 'kere (kick)' as the HMM is explained. FIG. 22 shows the results of using this system.

FIG. 22 shows the verification values of the input signal for words registered on the right side. Meanwhile, the lower the verification value, the higher is the degree of confidence.

For example, the system estimates the speech 'tomare' to be an input of the phoneme sequence 'tomare', with the verification being 0.136.

On the other hand, for input of an unknown word 'booru (ball)', lying in a third row from the top of FIG. 22, the model matched best to it is 'tomare', with the verification being extremely high and equal to 4.835. Thus, a new symbol 'unknown-1' is allocated and registered. Thus, for the next speech input, that is a speech input 'booru (ball)' shown on the fourth row from the top in FIG. 22, the HMM for the unknown-1 is closest, with the verification being of a small value of 0.41, so that 'booru' (ball)' is correctly acquired by unknown-1.

Moreover, since HMM is capable of recognizing the continuous speech, for the seventh speech from the top in FIG. 22 the symbol 'kere' can be recognized next to the label unknown-1 for the previously acquired label unknown-1.

In such speech recognition system, if a noun 'booru' is acquired, the robot apparatus 1 is able to kick a ball by a command 'booru kere' (kick a ball)'.

(4-2-1-4) Feeling Part (Emotion Part)

FIG. 23 shows the relationship between the internal state (internal variables) and the behaviors (subsystems) relevant thereto.

This instance, referencing a physiological model of the ingestive behavior, supposes an imaginary in-body nutrient accumulating buffer and an excrement buffer, for maintenance of the usual internal state, and defines the accumulated amounts as internal variables. Examples of the internal variables include the energy-2 (fake food) and fake excrements.

Figure 24:
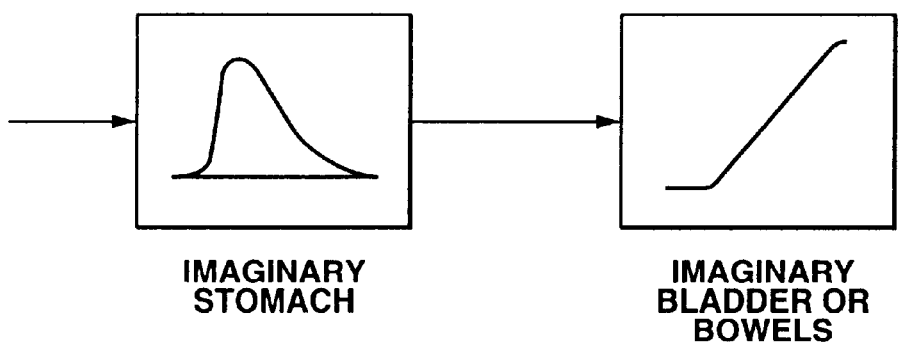
FIG. 24 shows the relationship between a virtual stomach and a virtual bladder.

By correlating the imaginary stomach (in-body nutrient accumulating buffer) and the imaginary bladder or intestines (buffer for excrements), decrease in the accumulated quantity in the imaginary stomach is designed to bring about an increase in the accumulated quantity in e.g., the imaginary bladder, as shown in FIG. 24.

As shown in FIG. 23, the internal variables have such dynamics which increase or decrease by certain factors. The basic operation of the motivation creator is to raise the motivation of the corresponding behavior group (subsystem) in order to maintain the internal variables within a certain allowable range.

The fake food or water is thought to be mounted mainly for improving entertainment character of the robot apparatus 1. In addition, there exist internal variables equivalent to the electrical energy or fatigue in the inherent sense of the term. These also constitute dynamics by the increasing or decreasing factors shown in FIG. 23. The motivation creator of the associated subsystem are designed to motivate the behavior in order to maintain these dynamics at a constant value. Such automatic charging behavior of the robot apparatus 1 mounting the so-called charging device as an autonomous behavior may be contemplated. However, if the robot apparatus 1 is not provided with such charging device, the robot apparatus 1 performs the behavior of requesting the charging, and has someone (human being) electrically charge its battery.

Similar internal state variables are readied for the information acquired by associative storage. With associative storage, the quantity of the acquired internal information is calculated and transmitted. In this case, the quantity of the internal information of the associative storage only increases except for the case of oblivion. However, oblivion does not have to be mounted. With the integration of the respective information quantities in a suitable time span as the increasing factor, simple dynamics of the temporal decrease factor is constructed to form the motivation of the information acquisition behavior subsystem.

(4-2-1-5) Learning Memory Part (Associative Memory Part)

Figure 25:
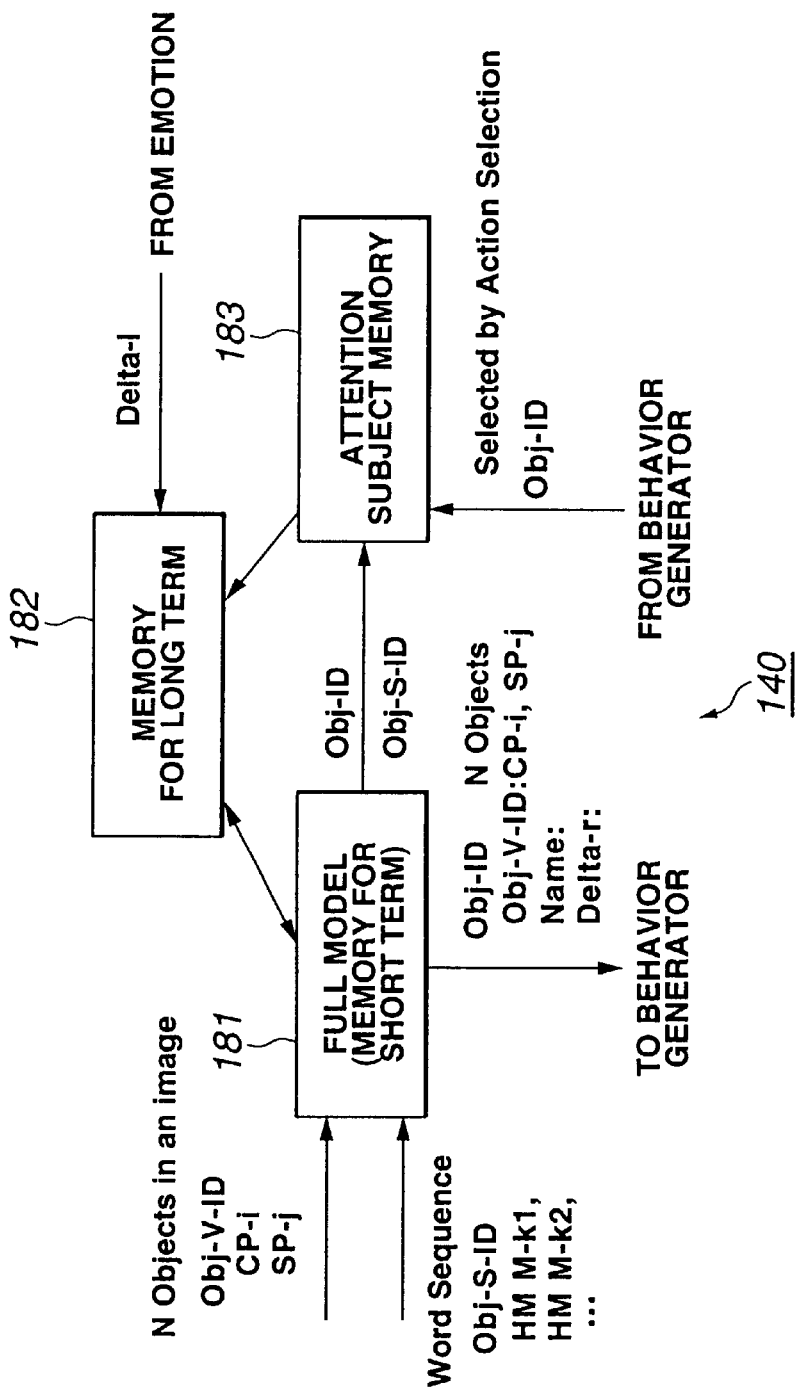
FIG. 25 is a block diagram showing the structure of a memory for learning.

FIG. 25 shows a concrete structure of an associative memory 140 used by the robot apparatus 1 in information acquisition. This associative memory 140 includes a memory for short term 181, a memory for long term 182 and a memory for objects of attention 183, as shown in FIG. 25. This associative memory 140 is specifically provided as shown in FIG. 12.

By the above-described structure, the associative memory 140 operates as a storage unit for an entity having a name for a certain color and a certain shape and also as a storage unit for the meaning such entity has for the internal state of the robot apparatus 1.

The short term memory (STM) 181 stores the information on an object in the picture provided with an ID number. The object information at this time is the information of the prototype number of the color (CP-i) and the shape prototype number (SP-j). The short term memory 181 is also fed with a word sequence for one speech input from speech processing.

The data from the picture is fed with the color prototype number (CP-i) and the shape prototype number (Sp-j) to acquire the object's name and the effect on the internal state (delta-I). These are grouped together and sent to a behavior generator 150, as shown in FIG. 12. If the object name (HMM-k) or the effect on the internal state (Delta-I) is not obtained, these are left as nil information and transmitted. The speech data is directly sent to the behavior generator 150.

On the other hand, the behavior (Action) and the object (Obj-ID) are selected at an action selection unit 116. This information is sent from a behavior state machine, as later explained, to the associative memory 140. The information corresponding to the object (Obj-ID) is stored from the short term memory 181 in the memory for objects of attention 183. Meanwhile, the uttered word sequence, stored in the short term memory 181, is directly sent to the attention object memory 183.

The timing of the learning from the attention object memory 183 to the long term memory 182, operating as an inherent associative memory 182 is set with the change in the internal variable as a trigger. Thus, as the internal variable is changed during the time an action is executed on an object, the delta value in the internal variable is stored in association with the object.

(4-2-1-6) Behavior Generating Part

Figure 26:
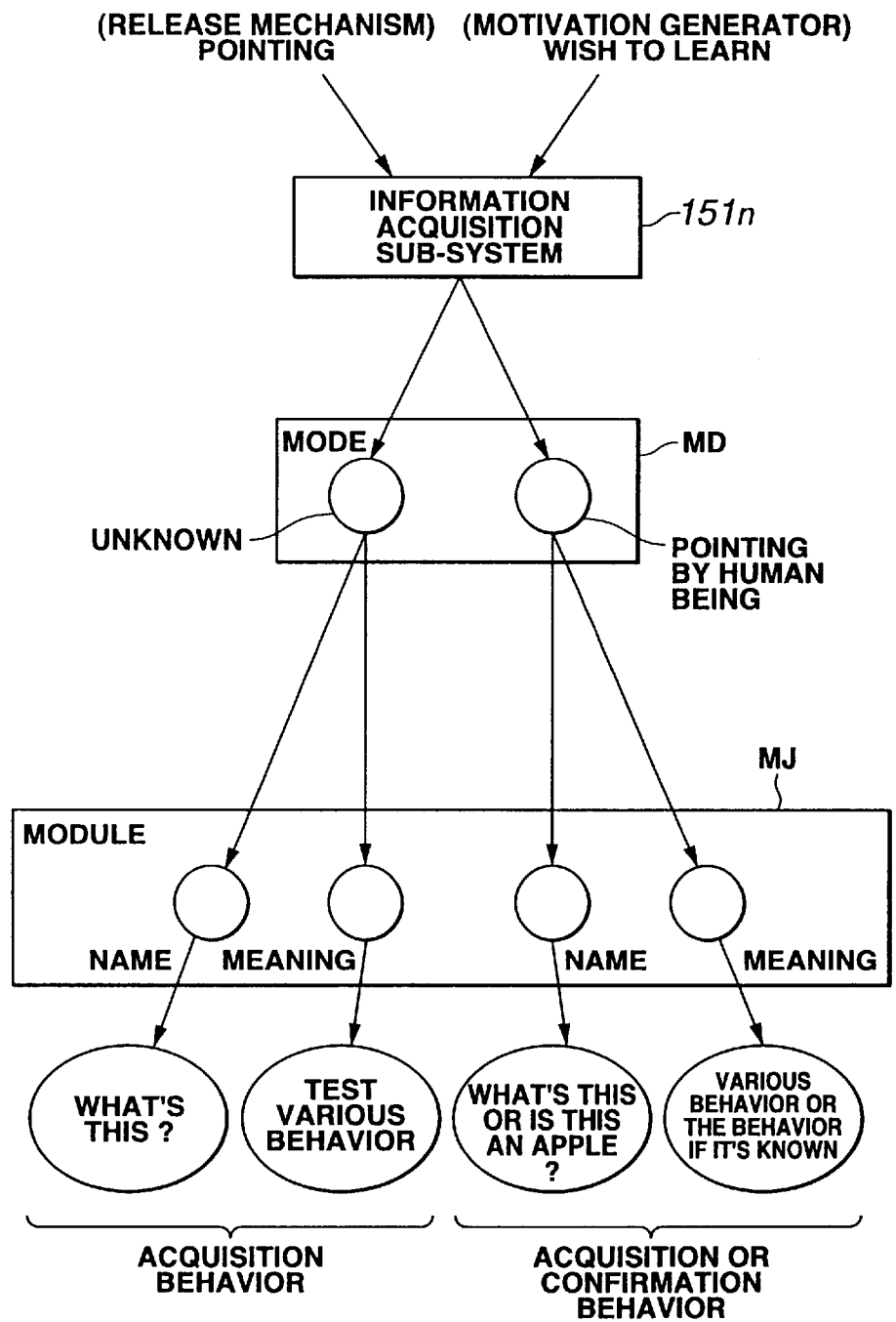
FIG. 26 shows the processing for realizing the information acquisition behavior or the information confirming behavior by joint attention from the information which is based on the stimuli from outside or from the internal state.

An information acquisition behavior subsystem 151$_n$, as a subsystem which prescribes the behavior of the robot apparatus 1, is now explained. The information acquisition behavior subsystem 151$_n$ is constructed as having a hierarchical structure, as shown in FIG. 26.

In a behavior subsystem layer, there is one software object.

A motivation creator 101 of the software object is constructed for outputting a motivation value when the aforementioned first-order internal storage quantity is deviated from an appropriate range.

$$MC\_val = 1 - \tan h(Int\_val) + \epsilon \qquad (4).$$

On the other hand, the release mechanism 102 checks an object sent from the associative memory 140. The release mechanism 102 takes into account the currently unknown and the perception (release) factor pertinent to the pointing by the human being. Among the release factors, there are, for example, an object name (Obj:Name) of an object (Object), name of a color (Color:Name), name of a shape (Shape:Name), and the effect on the changes in the internal variables of the object (Act:Delta-I).

The release mechanism 102 creates a release signal except if information definition has been made on what has been obtained as the release factor. The value of the release signal output by the release mechanism 102 is determined in association with the object as cumulative value of the undefined information on one object. For example, only the object name (Obj:Name) and the effect on the changes in the internal variables of the object (Act:Delta-I) may become the objects.

The release mechanism 102 evaluates the release signal for the existing object to select an object having the maximum value to output the ID specifying the so selected object (Obj) and the release signal.

If, for example, an apple is specified as an object, the robot apparatus 1 analyzes the shape or the color, using the aforementioned shape analysis or color, to evaluate the color name (Color:Name) and the shape name (Shape:Name) as the release factor. If the apple has been pre-registered, a high evaluation value is obtained, whereby the object is recognized as being an apple. The ID specifying the apple as the selected object and the release signal at such time are output. If the apple has not been pre-registered, the number of undefined apples is cumulatively summed and associated with applies as unknown objects.

The release mechanism 102 is set for generating still larger release signals responsive to the pointing by the human being. When the object detection by the pointing is made, the release mechanism 102 generates a release signal no matter whether the object is an unknown object or a previously known object. The underlying concept is that the pointing is obviously the request from the side of the human being for information acquisition or confirmation and hence the information acquisition behavior is desirably induced without dependency significantly on the internal state or a confirmation behavior is desirably performed for previously known objects.

In the information acquisition behavior subsystem 151$_n$, the product of this release signal and the motivation value is obtained as the behavior evaluation value (behavior value). In similar manner, each of the other subsystems, which prescribes e.g., the eating, uses the release signal and the motivation value, input to the information acquisition behavior subsystem 151$_n$, to obtain the behavior evaluation value (behavior value).

The action selection unit 116 compares the behavior evaluation values (behavior values) from the respective subsystems to select a subsystem having the maximum behavior value as being a subsystem to be executed. The explanation here is directed to a case where the behavior value in the information acquisition behavior subsystem $151_n$ is retained to be maximum.

Meanwhile, the selected subsystem needs to be continued to be selected fora while. This is made possible by, for example, mutual suppression or the fatigue factor.

When the information acquisition behavior subsystem $151_n$ is selected, processing transfers to a layer termed a mode MD, as shown in FIG. 26. In the mode MD, information selection is carried out in similar manner. Specifically, it is discriminated in the mode (Mode) whether the selection of the upper layer is the object by pointing or the object the robot apparatus itself has selected, that is an unknown object. If the distinction is made in this mode (Mode), evaluation as to the concrete behavior is made in a lower layer termed a module MJ. Based on this selection, a specified behavior is selected in the action selection unit 116.

In this manner, the robot apparatus 1 performs a confirmation behavior if the object is an already known object. If the object is an unknown object, the robot apparatus 1 conducts an acquisition behavior. The information acquisition behavior may be such that, if two sorts of the information have been acquired as for the name of the object (Obj:Name) and the effect on changes in the internal variables (Act:Delta-Int), the object which gave the maximum evaluation value at the subsystem may be checked to select one information.

As for the processing in case of executing the confirmation behavior, a command is sent to a state machine associated with the confirmation behavior and the confirmation behavior for the name in question is executed. The robot apparatus 1 approaches to the object pointed by the human being, as the robot apparatus performs visual tracking, and points the finger, that is fore limb, to the object, and manifest the behavior corresponding to 'Is this XX, isn't it?'. Such behavior is realized under control by the state machine stating a behavior sequence which prescribes the behavior.

As for the processing for acquisition behavior for the object name (Obj:Name), its output is sent to the state machine responsible for acquisition of the name of the corresponding object (Obj:Name).

In the acquisition behavior of the object name (Obj:Name), the robot apparatus approaches the object as it performs visual tracking and points to it to manifest the behavior corresponding to 'What's the name of this?'. Moreover, appropriate behavior control is made at this time using the distance from the object. This behavior is realized by the state machine which indicates the behavior sequence prescribing the behavior.

Such a state machine may be used which, next to 'What's the name of this?', repeatedly confirms any input phoneme sequence that is effective for outputting from the speech recognition unit.

On the other hand, if the acquisition behavior by the effect on changes in the internal variables (Act:Delta-Int), that is the acquisition behavior for the unknown object based on the changes in the internal variables, is selected, a number of behaviors are selected at random in connection with the object and executed. The effect on changes in the internal variables (Act:Delta-Int), that is produced at this time, is evaluated by associative storage. Since this correlates, or grounds, the object with the internal state, the effect on the changes in the internal variables for the new object is achieved as meaning acquisition.

For example, if the internal state is changed to 'pleasant' on seeing an apple, the change in the internal state is associated with the apple as the object. Subsequently, the robot apparatus 1 interprets the applied as being 'pleasant'. This means that the meaning acquisition of the apple has been achieved on the robot apparatus 1.

Meanwhile, applying the present invention to the robot apparatus 1, as described above, is able to be realized, for example, by a software.

INDUSTRIAL APPLICABILITY

With the present invention, as described above, the robot apparatus 1 is able to realize the information acquisition behavior as a part of the autonomous behavior and to execute the shared attention as an optimum behavior. In addition, the robot apparatus is able to acquire the meaning of an unknown object, obtained as changes in the internal state in the information acquisition behavior. This renders the robot apparatus more life-like.

What is claimed is:

1. A robot apparatus performing autonomous behavior based at least on an internal state, comprising:

an information acquisition model having a parameter of a desire for information acquisition as a change factor of said internal state;

behavior control means for causing the robot apparatus to perform an information acquisition behavior as being among the autonomous behavior based on the constancy of the internal state, when the parameter of said desire for information acquisition is of a preset threshold value; and wherein the parameter of said desire for information acquisition is changed with lapse of time.

2. A robot apparatus performing autonomous behavior based at least on an internal state, comprising:

an information acquisition model having a parameter of a desire for information acquisition as a change factor of said internal state;

behavior control means for causing the robot apparatus to perform an information acquisition behavior as being among the autonomous behavior based on the constancy of the internal state, when the parameter of said desire for information acquisition is of a preset threshold value; and wherein the parameter of said desire for information acquisition represents a hungry feeling for learning.

3. A robot apparatus performing autonomous behavior based at least on an internal state, comprising:

an information acquisition model having a parameter of a desire for information acquisition as a change factor of said internal state;

behavior control means for causing the robot apparatus to perform an information acquisition behavior as being among the autonomous behavior based on the constancy of the internal state, when the parameter of said desire for information acquisition is of a preset threshold value; and wherein the parameter of said desire for information acquisition is an amount of the acquired information.

4. A robot apparatus performing autonomous behavior based at least on an internal state, comprising:

an information acquisition model having a parameter of a desire for information acquisition as a change factor of said internal state;

behavior control means for causing the robot apparatus to perform an information acquisition behavior as being among the autonomous behavior based on the constancy of the internal state, when the parameter of said desire for information acquisition is of a preset threshold value; and wherein the parameter of said desire for information acquisition is an amount of learning for new information.

5. The robot apparatus according to claim 4 wherein the amount of learning decreases with lapse of time; and wherein if said amount of learning is lower than a preset threshold value, said behavior control means manifests said information acquisition behavior.

6. A robot apparatus comprising:

speech inputting means;

a plurality of models characterizing a plurality of word sequences, said models having been classified based on characteristic values of said word sequences prevailing when the word sequences have been uttered;

speech input evaluating means for evaluating speech inputs, made by said speech inputting means, in accordance with said word sequence characterizing models; and word sequence specifying means for specifying the word sequences of said speech input based on evaluation values of said speech input evaluating means.

7. The robot apparatus according to claim 6 wherein said speech input evaluating means includes a characteristic value detecting means for detecting characteristic values pertinent to the word sequence of the speech input made by said speech inputting means and an evaluating means for evaluating the characteristic values of the speech input, as detected by said characterizing value detecting part, based on said word sequence characterizing models.

8. The robot apparatus according to claim 7 further comprising:

model registration means for registering a characteristic value of a word sequence of a speech input as detected by said characterizing value detecting means as a new speech sequence characterizing model when the evaluation of the characteristic value of said speech input is low.

9. The robot apparatus according to claim 6 wherein said word sequence characterizing model has a characteristic value of a word sequence acquired by phoneme learning.

10. A behavior control method for a robot apparatus, said method comprising:

a speech inputting step;

a speech input evaluating step of evaluating speech inputs, made at said speech inputting step, in accordance with a plurality of models characterizing a plurality of word sequences, said models having been classified based on characteristic values of said word sequences prevailing when the word sequences have been uttered; and a word sequence specifying step of specifying the word sequences of said speech input based on evaluation values obtained at said speech input evaluating step.

11. A robot apparatus, acting autonomously, comprising:

a sensor for detecting an object;

a perception evaluating means for evaluating input signals from said sensor;

an internal state management means fed with results of evaluation of said perception evaluating part for managing fake internal states changed based on said results; and storage means for storing the relationship between said object and changes in said internal state which are based on said object.

12. The robot apparatus according to claim 11 further comprising:

an emotion means for generating a fake emotion based on changes in said internal state; wherein said object and the emotion-related information for the object are stored in said storage means.

13. The robot apparatus according to claim 11 further comprising:

a behavior generating means supervises said internal state so as to maintain constancy of said internal state, said internal state management means sends a first signal to said behavior generating part when the constancy is disturbed;

said behavior generating means generates a behavior to maintain said constancy based on said first signal.

14. The robot apparatus according to claim 13 wherein changes in said internal state and the behavior for maintaining said constancy are associatively stored in said storage means.

15. The robot according to claim 13 wherein said internal state management means has information acquisition desire variables and transmits a second signal to said behavior generating means based on the value of said information acquisition desire variables; and wherein said behavior generating means generates an information acquisition behavior based on said second signal.

16. A behavior control method for a robot apparatus, acting autonomously, comprising:

a perception evaluating step of evaluating input signals from a sensor which detects an object;

an internal state management step of managing fake internal states changed based on results of evaluation at said perception evaluating step; and a storage step of storing the relationship between said object and changes in said internal state which are based on said object.

* * * * *